United States Patent [19]
Spitzer

[11] Patent Number: 6,082,665
[45] Date of Patent: Jul. 4, 2000

[54] ROADABLE AIRCRAFT

[76] Inventor: Jeffrey J. Spitzer, 24414 Novato Pl., Ramona, Calif. 92065

[21] Appl. No.: 09/123,744

[22] Filed: Jul. 27, 1998

[51] Int. Cl.[7] .................................................. B64C 37/00
[52] U.S. Cl. .................................. 244/2; 246/49; 246/50; 246/221
[58] Field of Search ................................... 244/49, 2, 50, 244/220, 221, 225, 234

[56] References Cited

U.S. PATENT DOCUMENTS

| | | | |
|---|---|---|---|
| 2,011,254 | 8/1935 | Nightingale | 244/49 |
| 2,402,468 | 6/1946 | Thompson | 244/49 |
| 2,609,167 | 9/1952 | Gero | 244/2 |
| 2,674,422 | 4/1954 | Pellarini . | |
| 3,012,737 | 12/1961 | Dodd | 244/2 |
| 4,269,374 | 5/1981 | Miller | 244/49 |
| 4,579,297 | 4/1986 | Ayoola | 244/2 |
| 4,778,129 | 10/1988 | Byford | 244/49 |
| 4,986,493 | 1/1991 | Sarh | 244/2 |
| 5,836,541 | 11/1998 | Pham | 244/2 |

*Primary Examiner*—Galen L. Barefoot
*Attorney, Agent, or Firm*—John R. Ross; John R. Ross, III

[57] ABSTRACT

A roadable aircraft capable of flying as well as road travel. The wings of the roadable aircraft are defined by inner and outer wing panels. The outer wing panels are folded with a fold mechanism that rotates each of the outer wing panels from a substantially horizontal extended flying position to a substantially vertical extended position and then folds each of the outer panels into a direction parallel to the travel direction defined by the fuselage. An operator controlled selectable drive mechanism allows the operator to select either the propeller or drive wheel to receive power from the engine shaft.

43 Claims, 23 Drawing Sheets

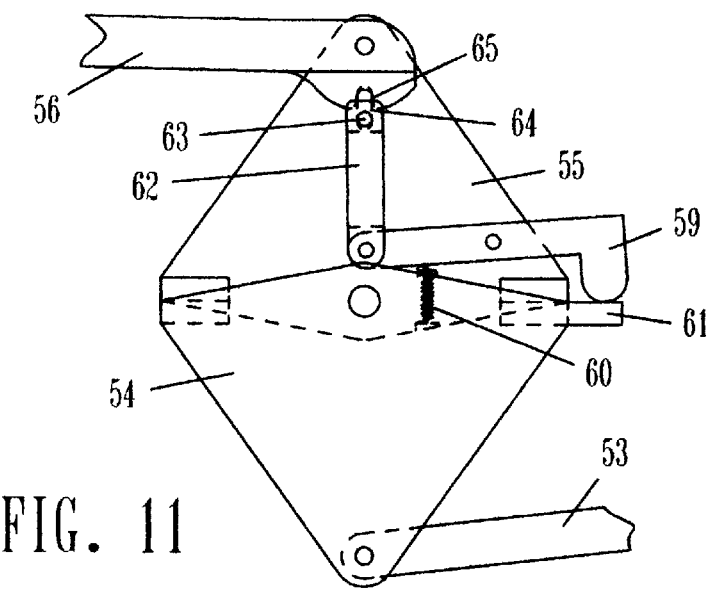
FIG. 11
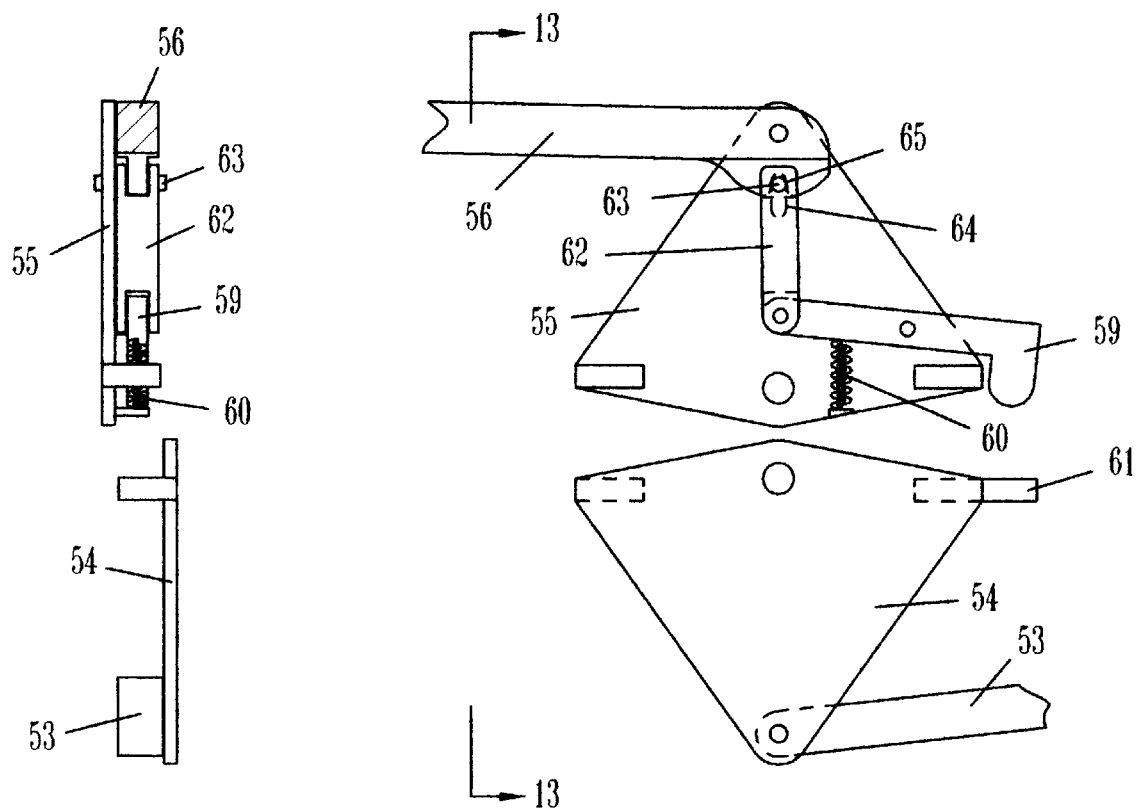
FIG. 13
FIG. 12

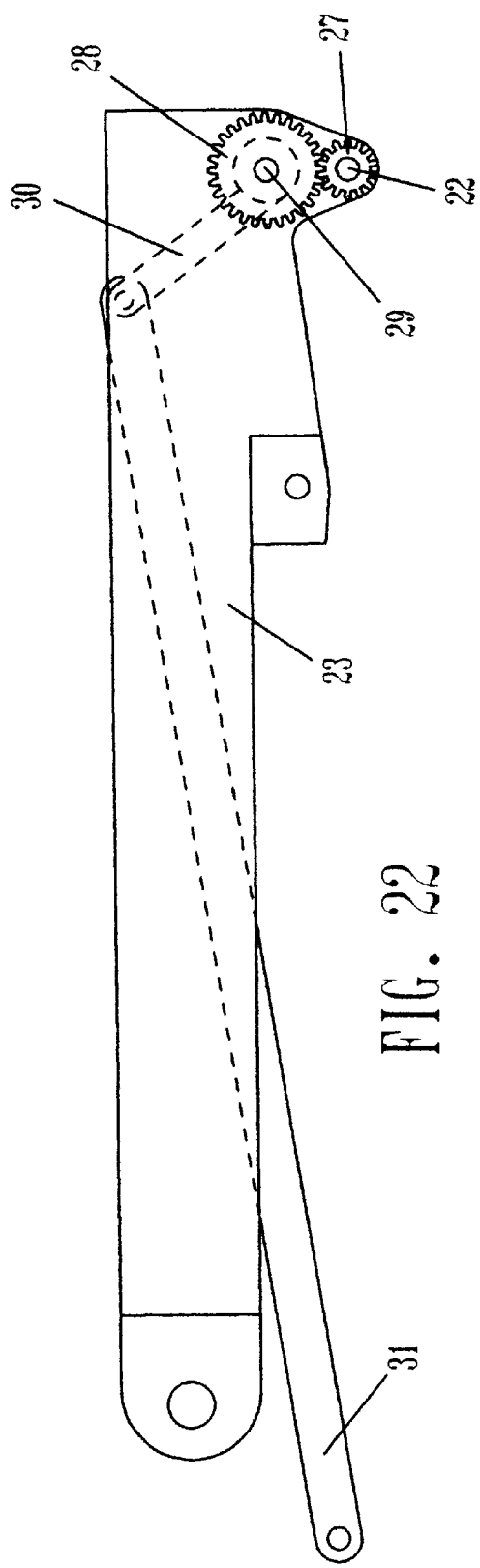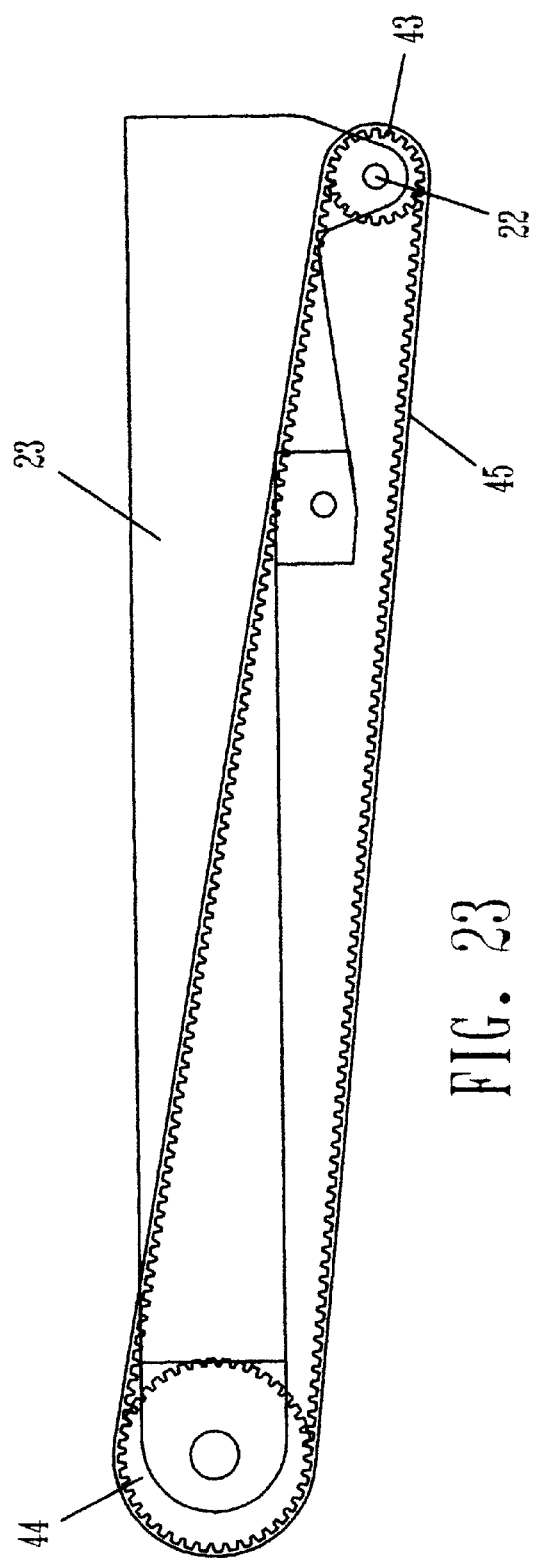

ROADABLE AIRCRAFT

This invention relates to aircraft and in particular to aircraft that can also function as an automobile.

BACKGROUND OF THE INVENTION

While there have been many designs for vehicles which can be substantially converted in appearance or function from automotive fashion to airplane fashion, they have failed to become successful products in the commercial market. This is usually a direct result of the various conflicting requirements that arise when one attempts to combine these two types of vehicles. The previous inventors have typically focused on addressing one or more of these conflicts but have not fully resolved all issues in order to provide for a practical vehicle in both modes. In some other cases the resulting combination vehicle is either too complex or impractical for commercial acceptance.

One problem with prior art devices is that they fail to adequately provide a manner in which to deal with the wings when transitioning from airplane mode to highway mode. Many past designs have provided wings that can be folded. Multiple joints or complex folding mechanisms of prior art devices typically add too much weight or cost to the vehicle. In some cases stowage schemes compromise aesthetics, or highway aerodynamics excessively. In other cases wing design for aircraft mode is compromised yielding unacceptable flying qualities. U.S. Pat. Nos. 4,986,493 and 4,579,297 are examples of vehicles that have wing folding means which are too complex to be practical. In a preferred embodiment, wing folding is accomplished easily with actuators.

A second problem found in prior art devices is inadequate propulsion of the vehicle in each mode. Simplified designs have proposed using aerodynamic thrust to propel the vehicle in both modes. For example, U.S. Pat. No. 2,674,422 provides a vehicle that proposes using aerodynamic thrust for automotive propulsion. This is a big problem on public highways, however, because excessive noise and foreign object entrainment result. An alternative is to drive one or more wheels with the same engine that drives the propeller, which has also been done but the transmission systems proposed have not produced good results. It is well known that drive wheels must support a substantial vehicle mass fraction in order to provide sufficient traction. This requirement, when applied to aircraft, causes another conflict. In order for a conventional aircraft to have acceptable take-off and landing qualities the center of gravity must be located very close to the main load bearing wheels. When the center of gravity is placed near one or more wheels (as is the case in prior art devices), unacceptable tipping resistance occurs for accelerations associated with highway operation.

What is needed is a practical roadable aircraft.

SUMMARY OF THE INVENTION

The present invention provides a roadable aircraft capable of flying as well as road travel. The wings of the roadable aircraft are defined by inner and outer wing panels. The outer wing panels are folded with a fold mechanism that rotates each of the outer wing panels from a substantially horizontal extended flying position to a substantially vertical extended position and then folds each of the outer panels into a direction parallel to the travel direction defined by the fuselage. An operator controlled selectable drive mechanism allows the operator to select either the propeller or drive wheel to receive power from the engine shaft.

BRIEF DESCRIPTION OF THE DRAWINGS

FIG. 11 is a partial fragmentary sectional rear elevation taken on line 11—11 in FIG. 1 showing the rocker and associated latch mechanism used to pass control movements through the wing joint and allow decoupling of the inboard and outboard mechanisms while simultaneously and automatically latching the outboard mechanism against unwanted movements.

FIG. 12 is a partial fragmentary sectional rear elevation taken from the same perspective as FIG. 11 where the inboard and outboard mechanisms have been partially separated and fully decoupled and the aforementioned automatic latching has been accomplished.

FIG. 13 is a partial fragmentary sectional side elevation taken on line 13—13 in FIG. 12 showing said inboard and outboard rocker and latch mechanisms decoupled.

FIG. 22 is a partial fragmentary sectional view taken on line 21—21 in FIG. 3 showing the wing rotation phasing mechanism in the preferred embodiment.

FIG. 23 is a partial sectional view of an alternate embodiment for the wing rotation phasing mechanism.

DETAILED DESCRIPTION OF THE PREFERRED EMBODIMENT

Figure 1:
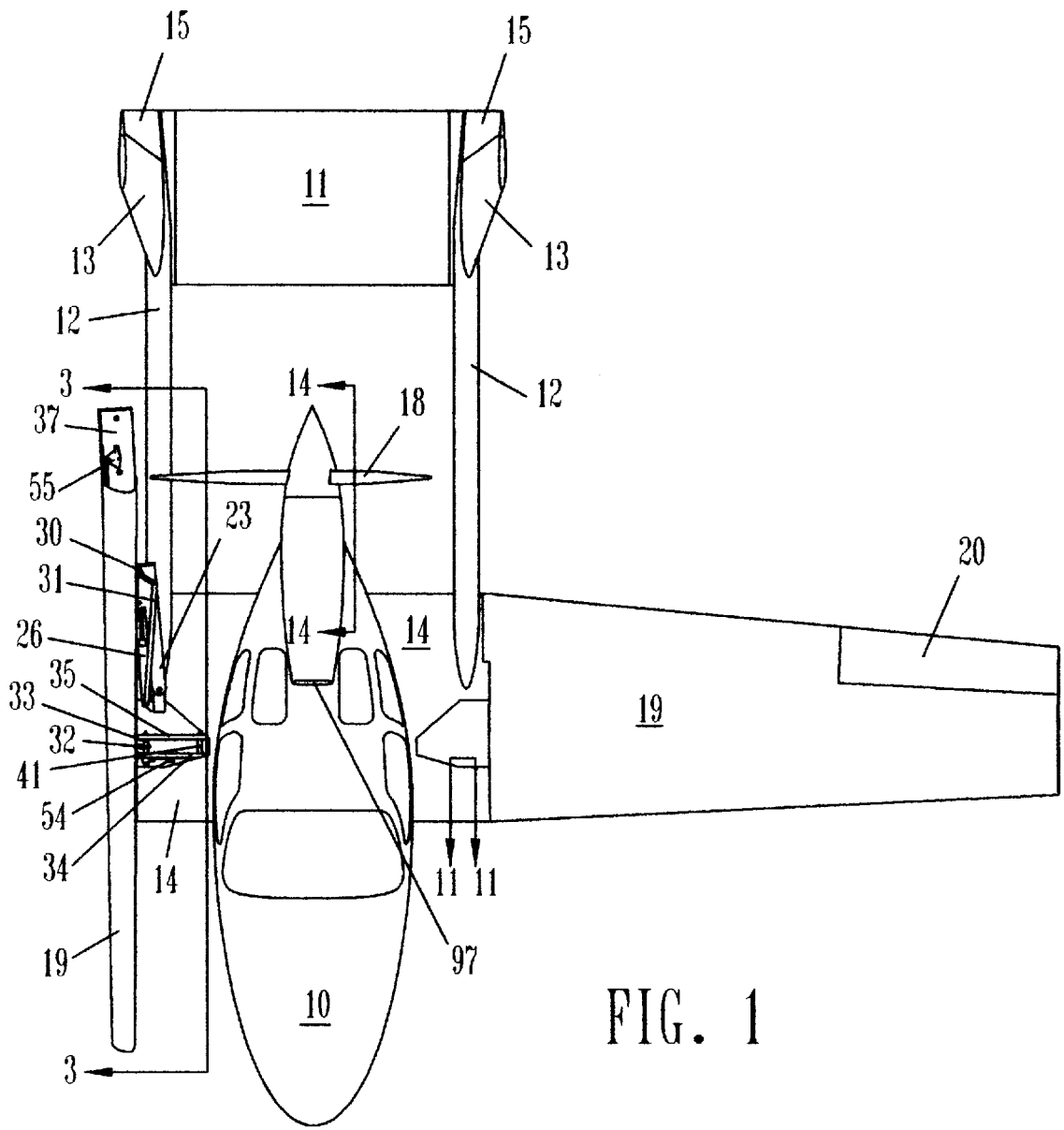
FIG. 1 is a top view of the assembly in which the left side wing is configured for airplane operation and the right side wing is configured for highway operation.
Figure 3:
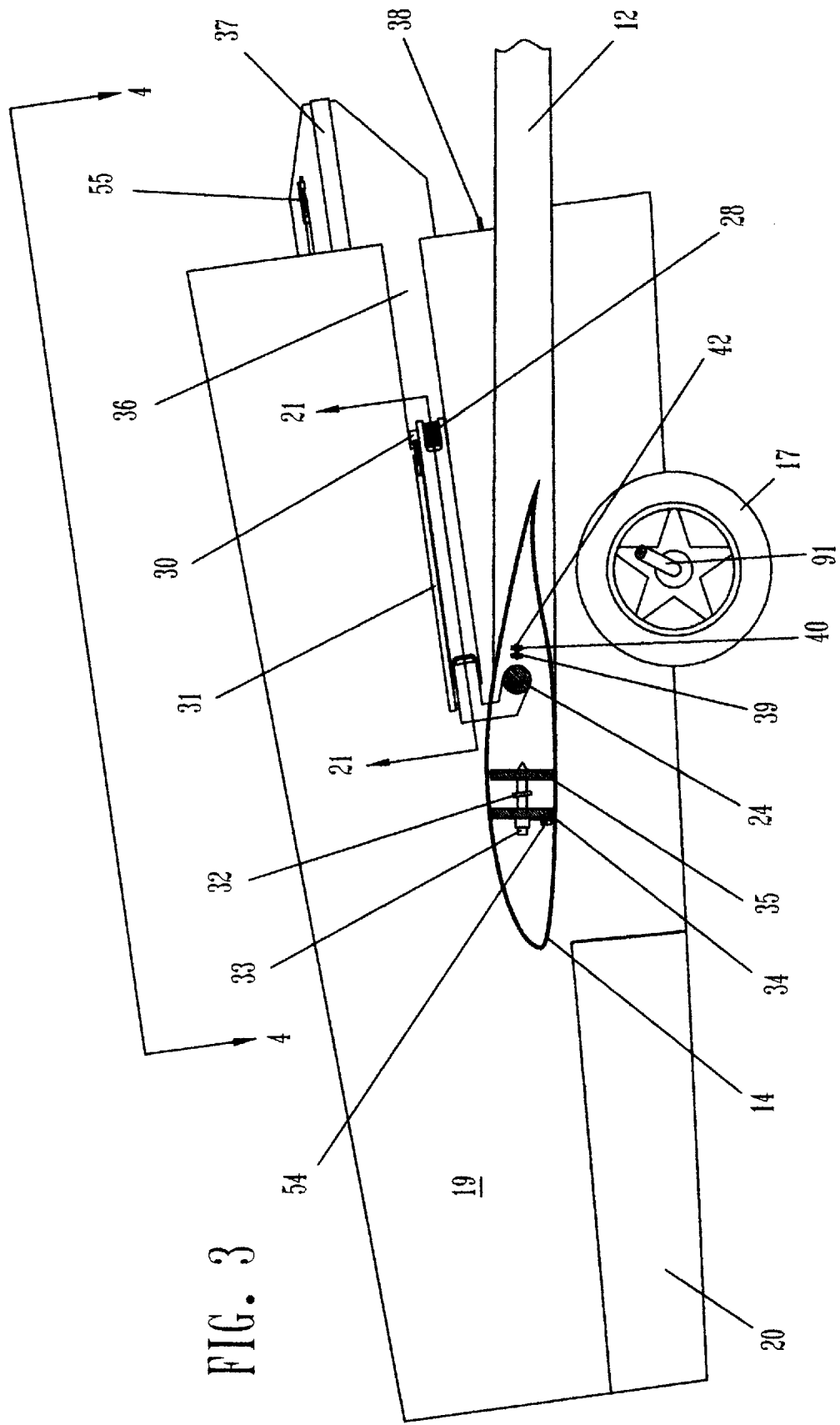
FIG. 3 is a fragmentary sectional elevation view showing the right side wing arranged for highway operation taken on line 3—3 in FIG. 1.
Figure 4:
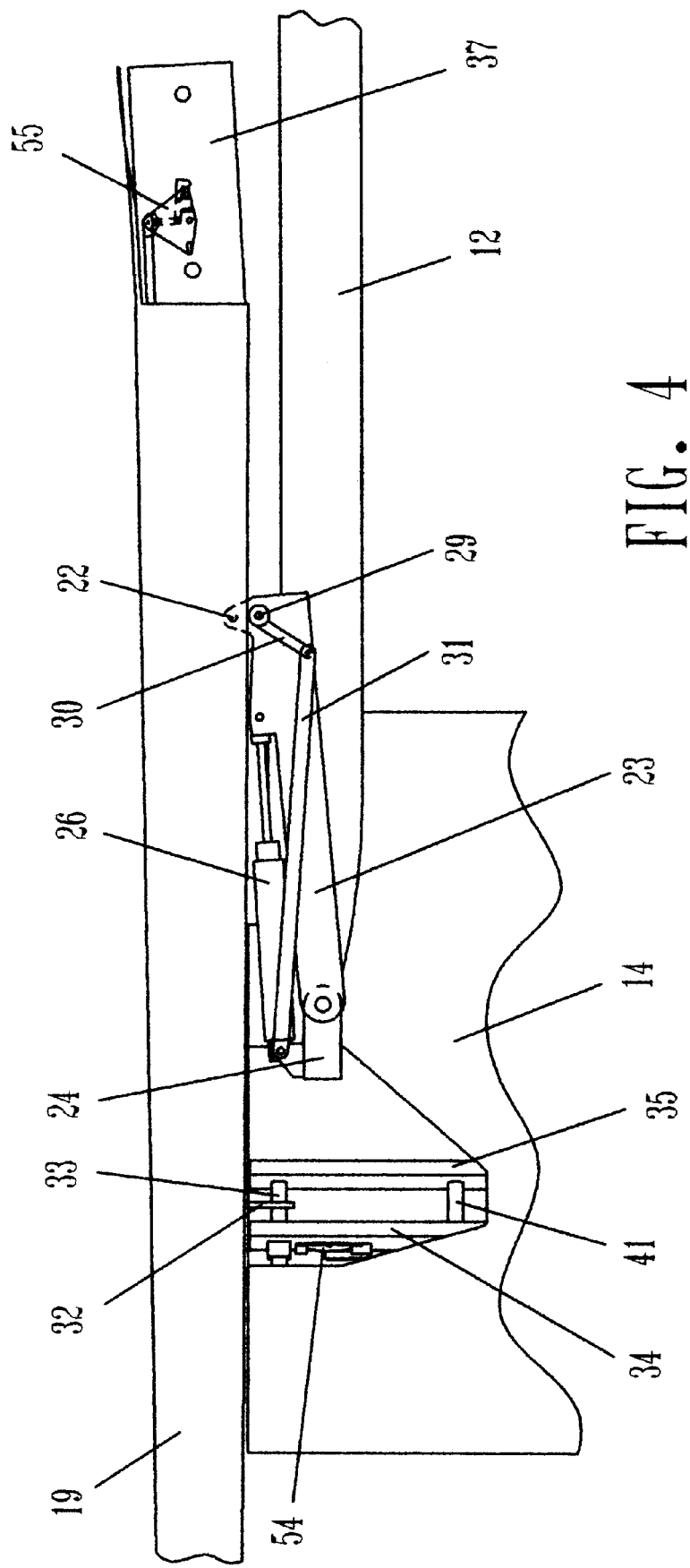
FIG. 4 is a fragmentary view aligned perpendicular to the principle folding axis taken on line 4—4 in FIG. 3.
Figure 10:
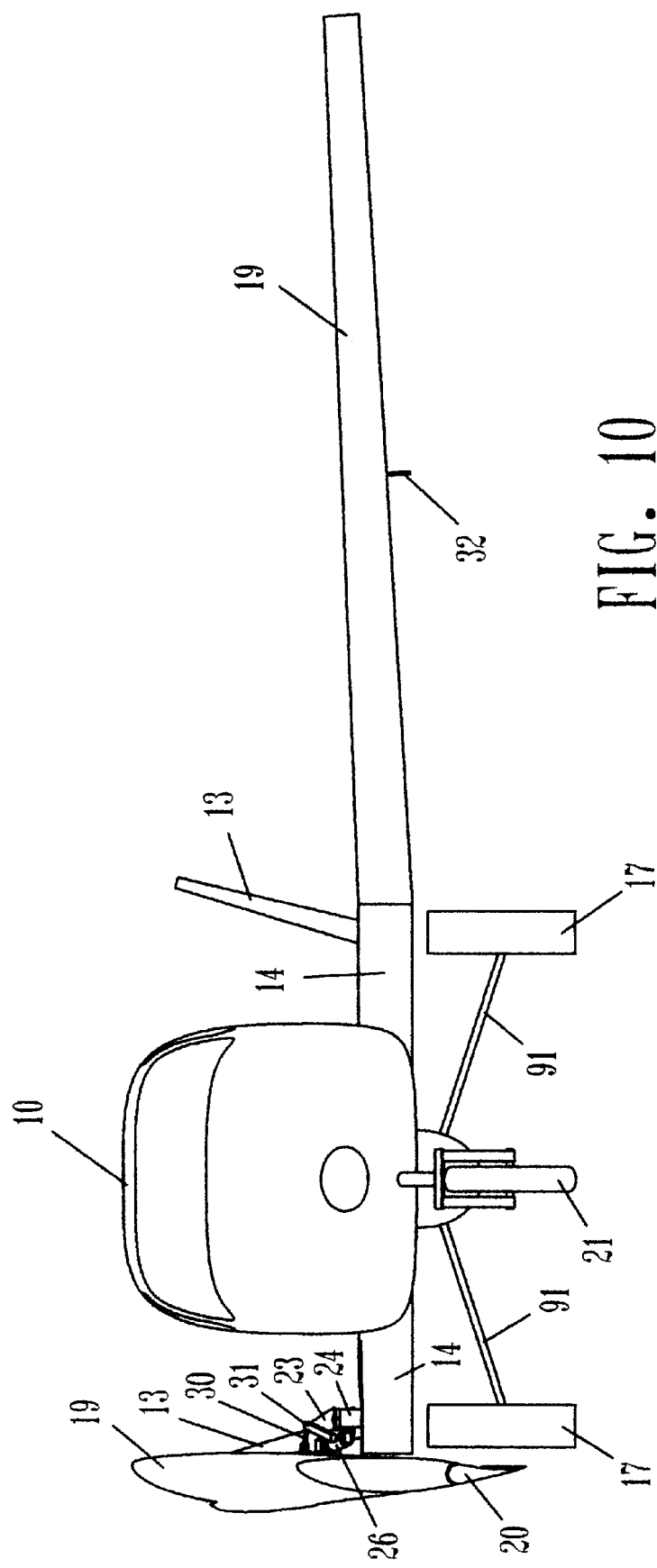
FIG. 10 is a front elevation view of the assembly as shown in FIG. 1.

A preferred embodiment of the present invention is shown in FIG. 1. One outer wing 19 is shown extended as for flying and the other outer wing 19 is shown folded as for roadway travel. The roadable aircraft 1 has the usual aerodynamic pitch controls comprising at least one horizontal stabilizer 11, as shown in FIG. 1. Horizontal stabilizer 11 is pivotally mounted to tail structures 12. Roadable aircraft 1 has aerodynamic yaw controls comprising two stabilizers 13 attached to the tail structures 12. In the preferred embodiment, tail structures 12 are rigidly attached to inner wing panels 14. One rudder 15 is hingedly attached to each of two vertical stabilizers 13. Outer wing panels 19 are configured in the usual manner for aircraft operations and can folded for highway operation as will be discussed later. Aerodynamic roll control is achieved with usual ailerons 20 hinged to outer wing panels 19. The assembly has an engine 16 within the fuselage 10 that can be configured to drive principle load bearing wheels 17 (as shown in FIG. 3) or propeller 18. Roadable aircraft 1 has one lightly loaded wheel 21 (as shown in FIG. 10) that is steerable when the assembly is configured for automobile operations and is located at the front of the assembly.

Folding of Wings

Disengage Pins Attaching Outer Wing Panels to Inner Wing Panels

Figure 2:
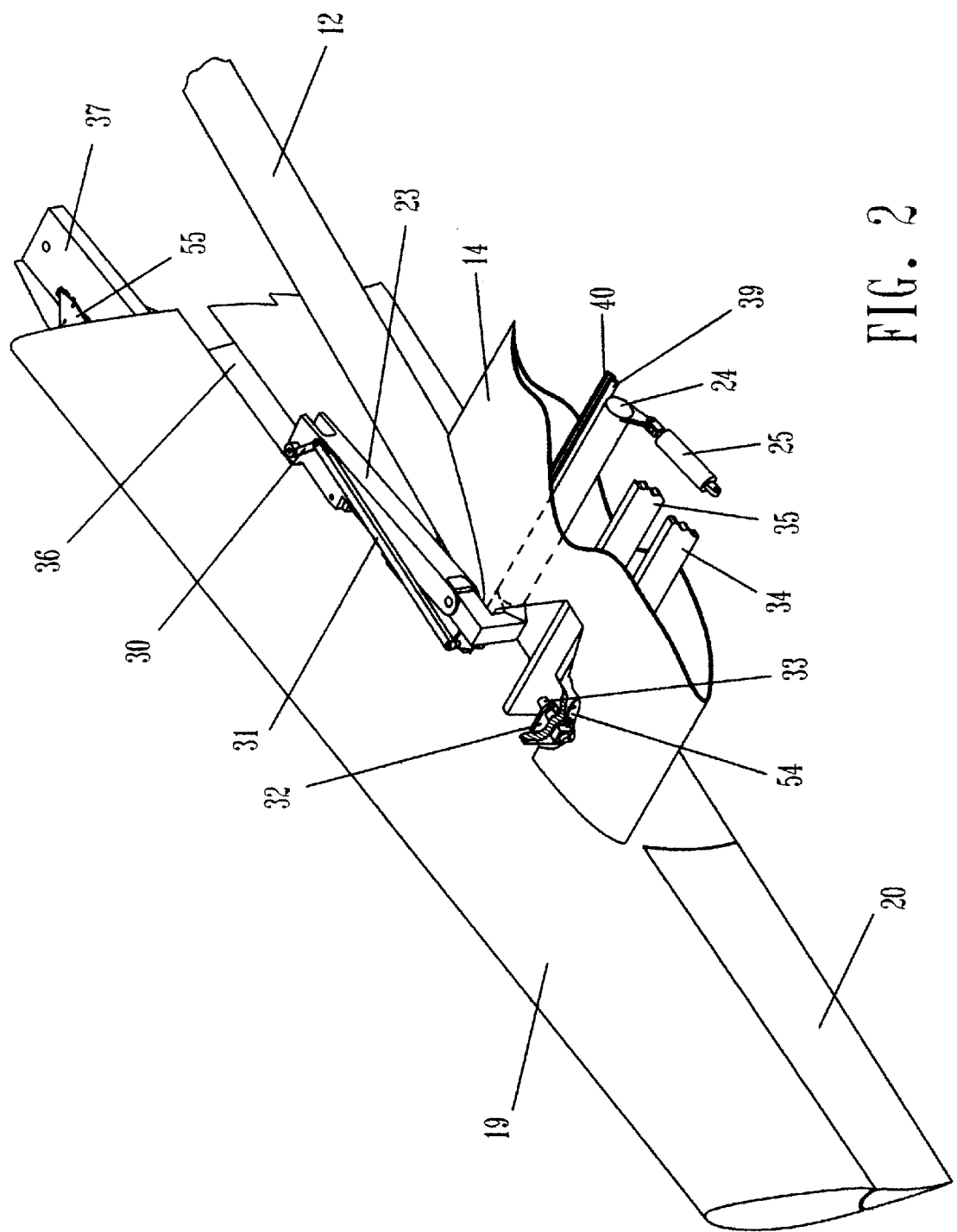
FIG. 2 is a fragmentary perspective view of the same right wing of FIG. 1 shown enlarged to reveal more detail of the folding means. Also, a portion of the wing has been sectioned near the fuselage side to reveal additional folding means.
Figure 9:
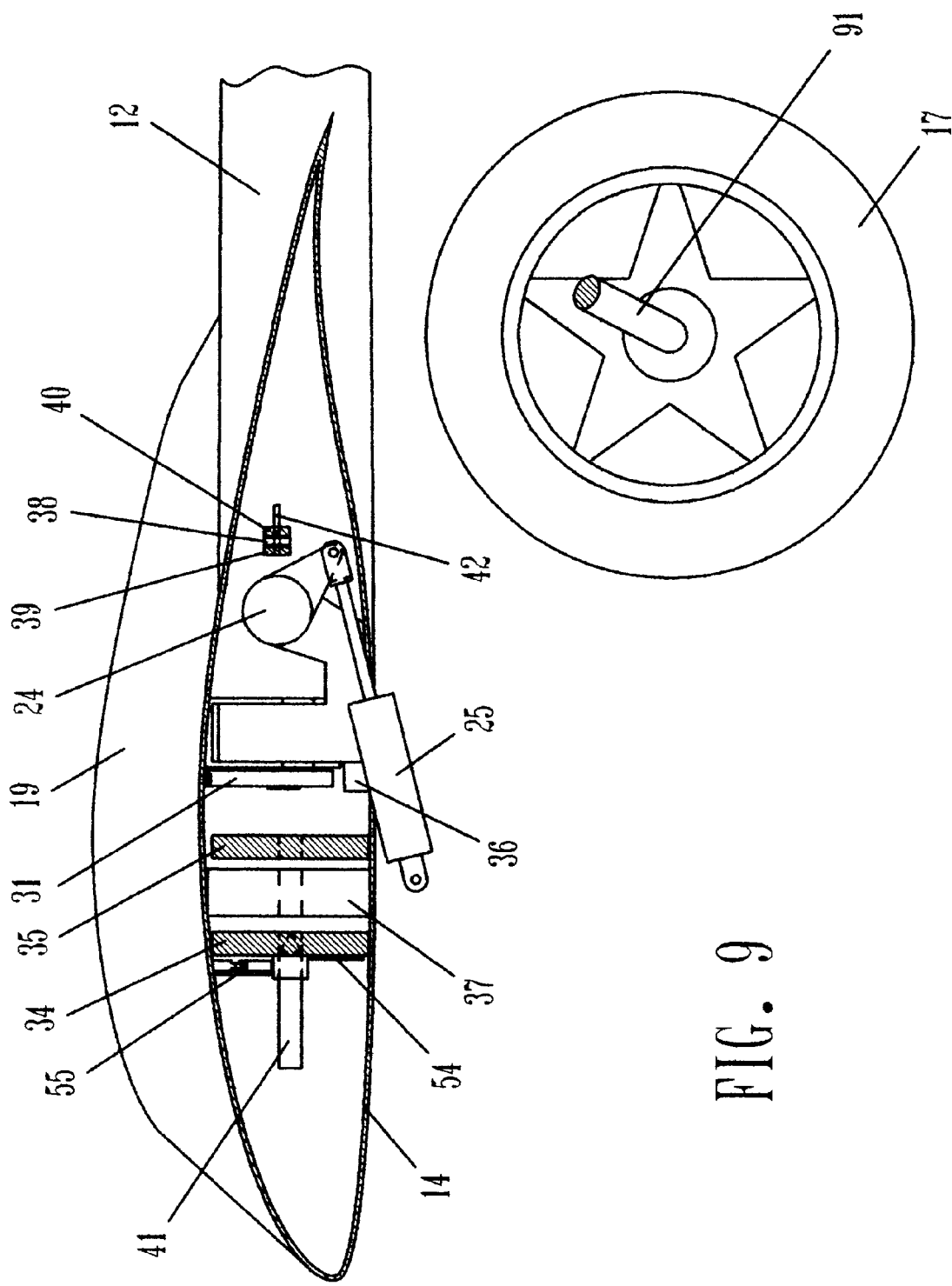
FIG. 9 is a fragmentary sectional elevation view taken from the same perspective as FIG. 8 showing the wing completely unfolded awaiting insertion of the pins which will lock it into the airplane operational arrangement.

FIGS. 2, 3, 4 and 9 show right outer wing panel 19 disengaged from right inner wing panel 14 in order to present a view of the pins and spars used for attaching the two wing panels together. FIG. 2 shows outer main spar 37 and inner main spars 34 and 35. When roadable aircraft 1 is in its aircraft mode, main spar 37 aligns vertically with main spars 34 and 35 and is connected to main spars 34 and 35 with two pins, one of which is shown in FIG. 9. Suitable actuators (not shown) are employed to slidably remove the pins which engage structural components contained within the respective wing panels. In the preferred embodiment, outer pin 33, which is slidably attached to first inner spar 34, is slidably removed from second inner spar 35 and then through outer main spar 37 (FIG. 2). Similarly, inner pin 41 (FIG. 4), which is slidably attached to first inner spar 34, is also slidably removed from second inner spar 35 and then through outer main spar 37. Similarly, aft pin 42, which is slidably attached to fourth inner spar 40 (FIG. 9), is slidably removed through third outer spar 39 and then through outer aft spar 38 (FIG. 3).

Rotate Outer Wing Panels So That They are Approximately Vertical

FIG. 9 shows outer wing panel 19 aligned with inner wing panel 14 in the correct position for aircraft operation with pins disengaged. In order to rotate outer wing panel 19 to the approximately vertical position shown in FIG. 8, rotation arm 24 is rotated approximately 84 degrees. A perspective view of rotation arm 24 is shown in FIG. 2. A linear actuator 25 is employed as a rotation actuator and is pivotally mounted to rotation arm 24 at one end and pivotally anchored to fuselage 10 (not shown) at the other end.

Rotate Outer Wing Panels So That They are Parallel to the Fuselage

Figure 5:
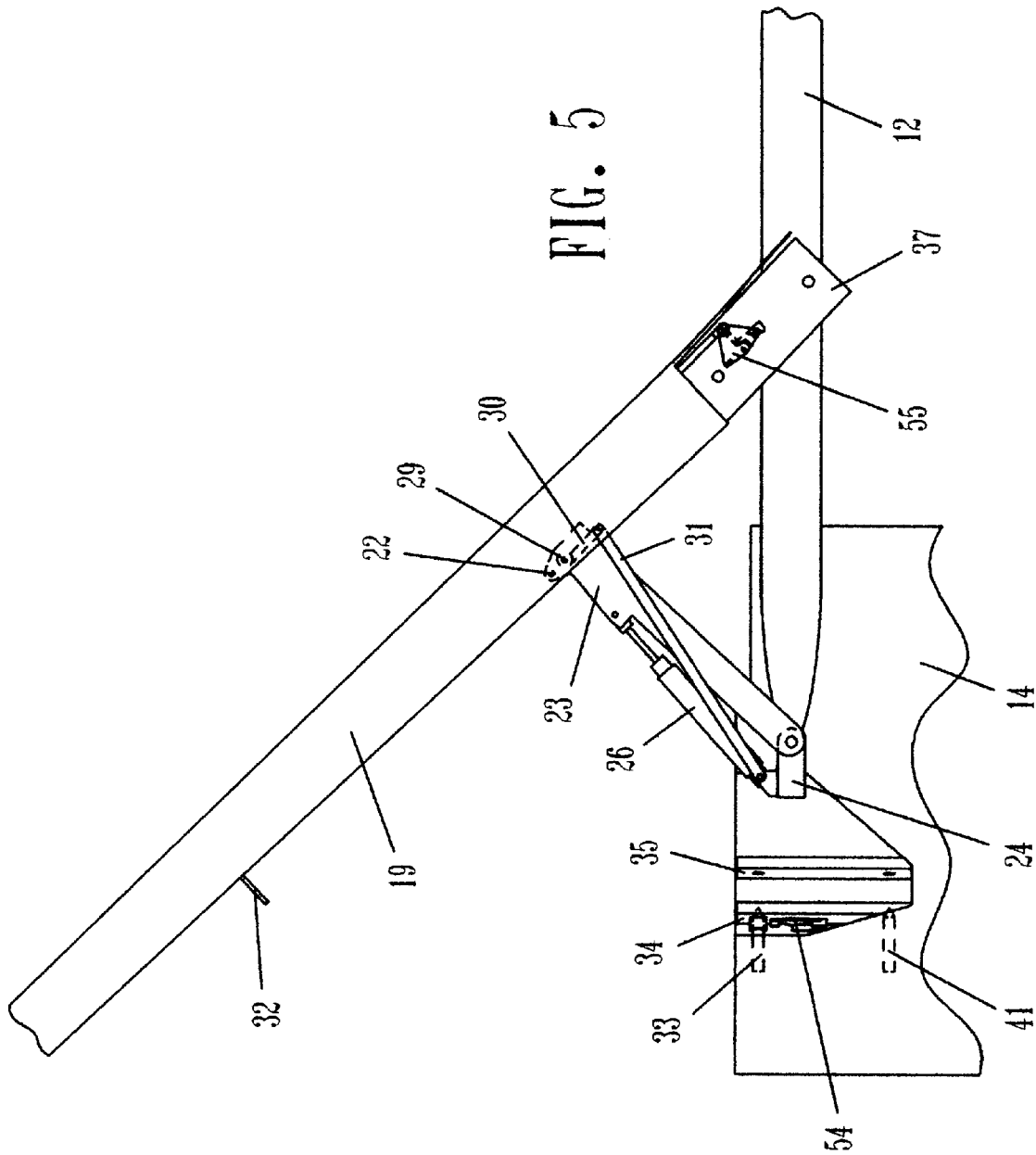
FIG. 5 is a fragmentary view from the same perspective as FIG. 4 showing the wing partially unfolded.
Figure 6:
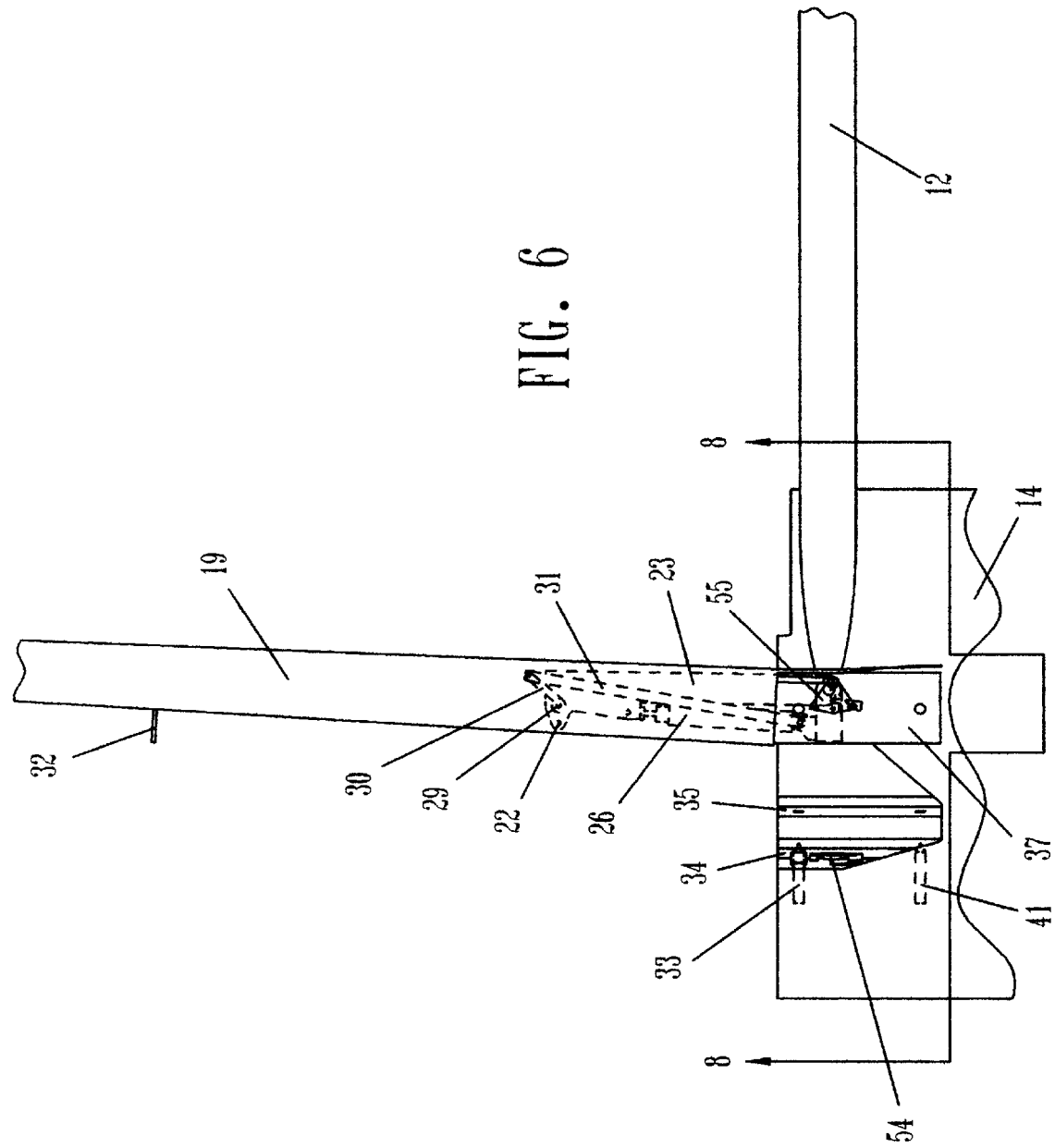
FIG. 6 is a fragmentary view from the same perspective as FIG. 4 showing the wing partially unfolded further.
Figure 7A:
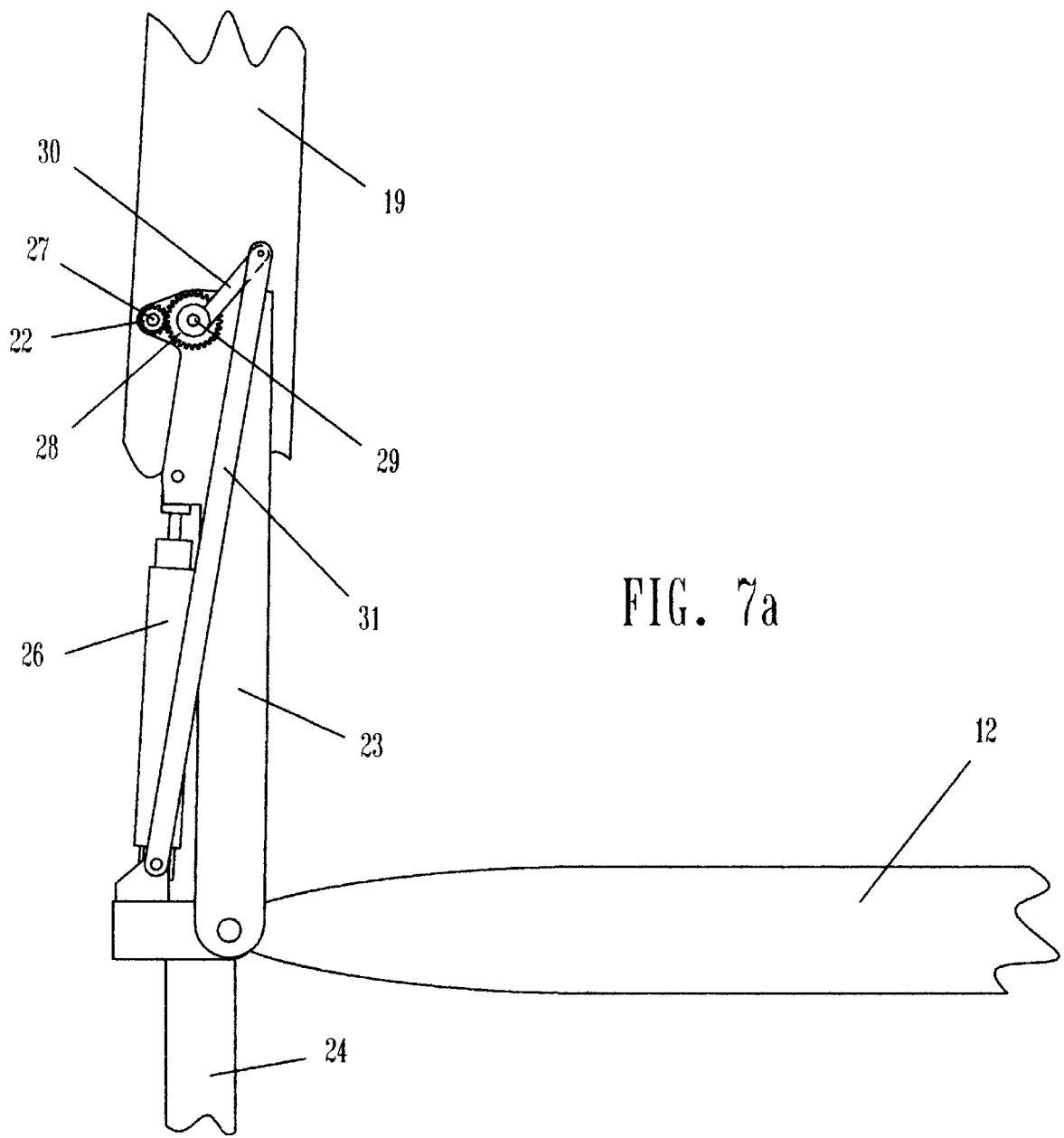
FIGS. 7A–7C show the reverse folding sequence of FIGS. 4–6 with the fold arm folding the outer wing panels so that they are parallel to the direction of travel and in position for automobile operations. The inner wing panels have been removed for clarity and the phasing gear operation is depicted.
Figure 7B:
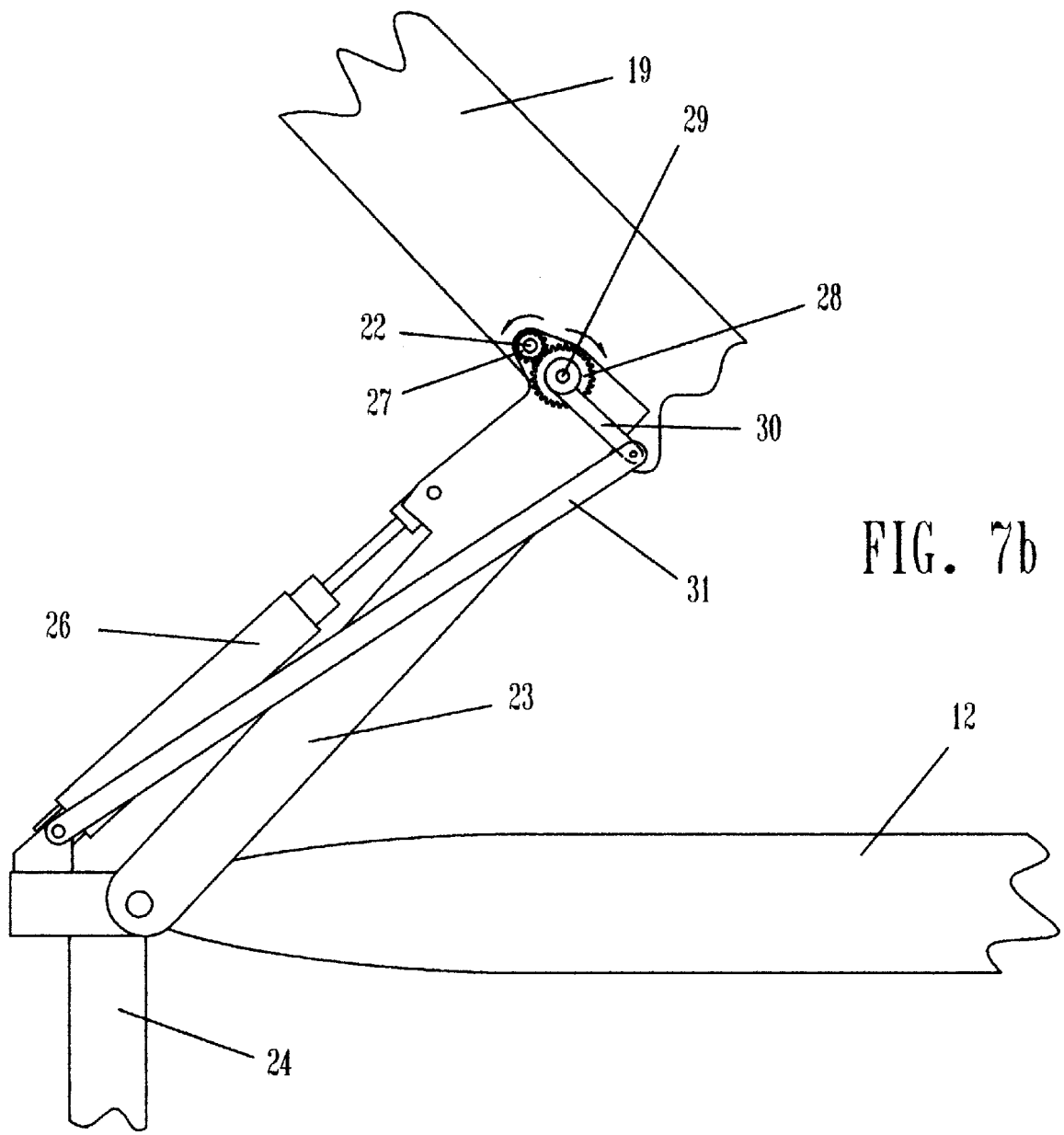
Figure 7C:
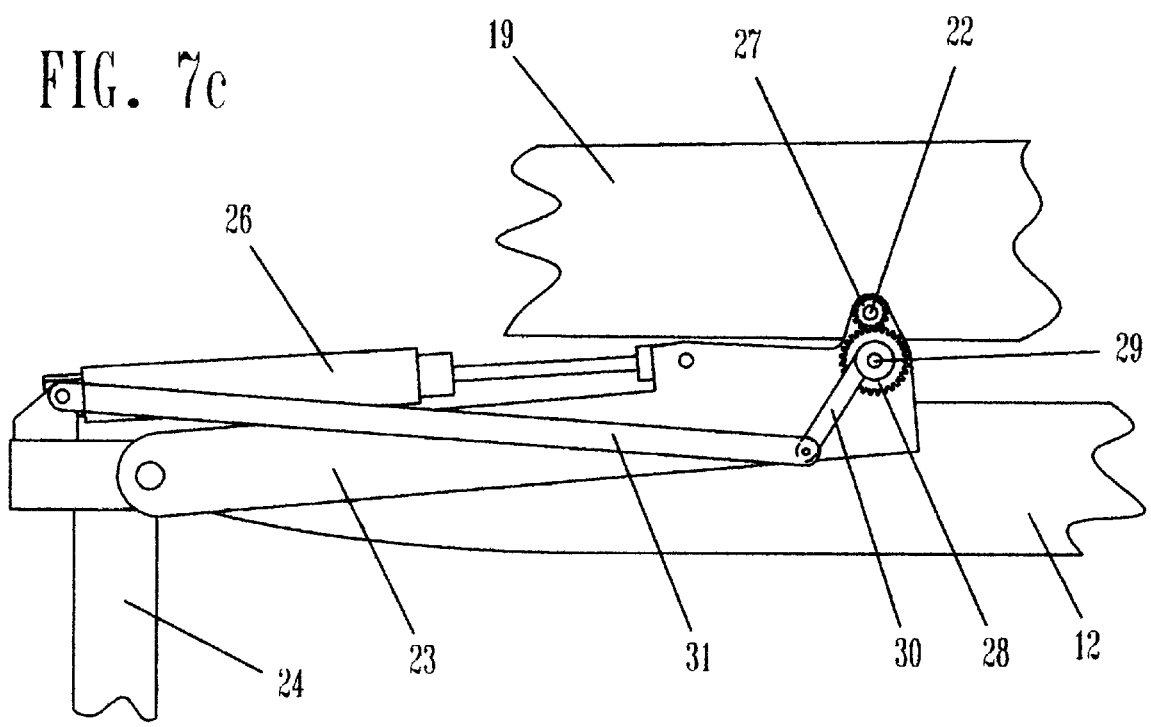
Figure 8:
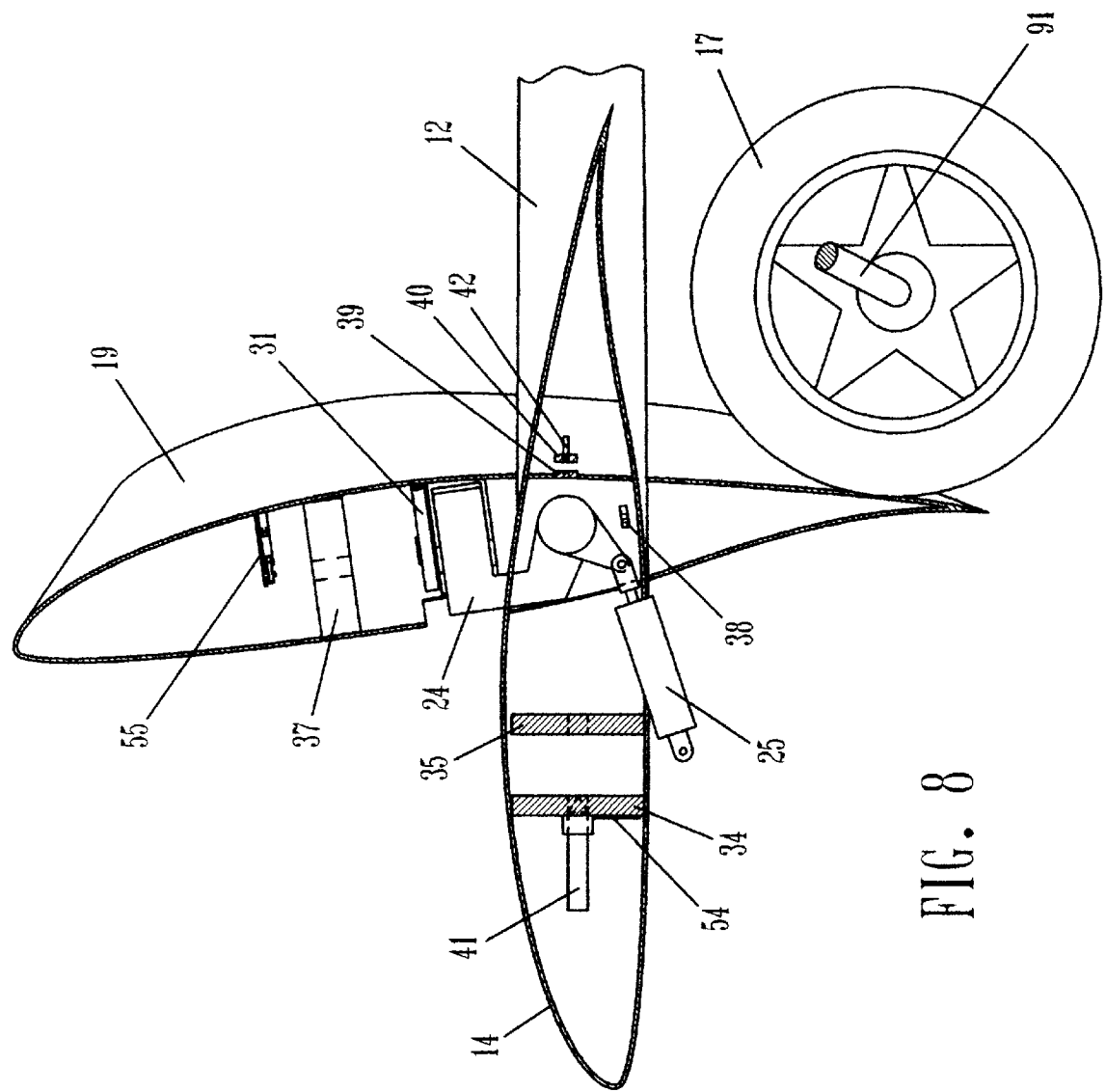
FIG. 8 is a fragmentary sectional elevation view showing the right side wing partially unfolded as shown in FIG. 6. The complex section taken on line 8—8 in FIG. 6 is extended into the fuselage to show the secondary rotation means.

FIG. 6 and FIG. 8 show outer wing panel 19 aligned substantially vertical and normal to inner wing panel 14. In order to rotate outer wing panel 19 so that it is parallel to fuselage 10, fold actuator 26 is expanded, as shown in FIG. 5. The expansion of fold actuator 26 causes the outer end of outer wing panel 19 to fold towards the forward end of roadable aircraft 1 and the inner end of outer wing panel 19 to fold towards the rear end of roadable aircraft 1. A more detailed description of the folding mechanism is given by reference to FIGS. 7A–7C. Outer wing panel 19 is rigidly attached to pivot shaft 22. Pivot shaft 22 is pivotally mounted to fold arm 23. Fold arm 23 is pivotally mounted to rotation arm 24. Rotation of fold arm 23 is accomplished with any suitable actuator. In the preferred embodiment, fold actuator 26 is pivotally mounted to fold arm 23 at one end and pivotally mounted to rotation arm 24 at the other end. Critical to the operation of the wing folding is the manner in which pivot shaft 22 is connected through a suitable mechanism to rotation arm 24. This mechanism is such that an angular rotation of pivot shaft 22 (and therefore an equivalent rotation of outer wing panel 19) is approximately twice the angular rotation of fold arm 23. In the preferred embodiment, pivot shaft 22 is rigidly fitted with pivot shaft gear 27 that engages phasing shaft gear 28. Phasing shaft gear 28 is rigidly attached to phasing shaft 29. Phasing shaft 29 is pivotally mounted to fold arm 23. Phasing arm 30 is rigidly attached to phasing shaft 29. Phasing link 31 is pivotally attached to phasing arm 30 and rotation arm 24.

As shown in FIG. 7B, as fold actuator 26 expands, fold arm 23 rotates clockwise around its pivot point on rotation arm 24. Phasing arm 30, pivotally connected to phasing link 31, likewise rotates clockwise around its pivot point of phasing shaft 29. Because phasing shaft 29 is rigidly connected to both phasing arm 30 and phasing shaft gear 28, phasing shaft gear 28 rotates clockwise. Phasing shaft gear 28 engages pivot shaft gear 27, and therefore as phasing shaft gear 28 rotates clockwise, pivot shaft gear 27 rotates counterclockwise. Because pivot shaft 22 is rigidly connected to pivot shaft gear 27 and outer wing panel 19 is rigidly connected to pivot shaft 22, outer wing panel 19 rotates counter clockwise as pivot shaft gear 27 rotates counterclockwise.

As shown in FIG. 7C, when fold actuator 26 is completely expanded, fold arm 23 is substantially parallel to tail structures 12. Phasing arm 30, and therefore phasing shaft gear 28, has rotated approximately 90 degrees clockwise from its starting position relative to fold arm 23, as shown in FIG. 7A. The ratio of phasing shaft gear 28 to pivot shaft gear 27 is approximately 2:1. Therefore, it should be obvious to one of ordinary skill in the art, that full expansion of fold actuator 26 will cause outer wing panel 19 to rotate approximately 180 degrees counterclockwise relative to fold arm 23 and align in a substantially parallel position adjacent to tail structures 12.

Engage Pins through Wing Latch Plate and Inner Spars

Outer wing panels 19 are attached to inner wing panels 14 through a combination of the previously described folding components and suitable pins or bolts through structural components. In order to restrain outer wing panel 19 in the folded position (FIG. 2), the rotation actuator 25 and fold actuator 26 are rigidly held in the folded position as shown in FIGS. 7A–7C. As shown in FIG. 2, additional rigidity can be provided by latch plate 32, which is rigidly attached to outer wing panel 19. In the folded position, latch plate 32 is pivotally engaged by outer pin 33. Outer pin 33 is slidably attached to first inner spar 34 and can be moved by suitable actuator (not shown) to slide through a hole in latch plate 32 and then slidably engage a hole provided in second inner spar 35.

Unfolding of Outer Wing Panels

Unfolding of the outer wing panels is achieved by first slidably removing outer pin 33 first from second inner spar 35 and then from latch plate 32. Next, fold actuator 26 (FIGS. 7A–7C) is retracted causing a rotation of fold arm 23 and a corresponding rotation of outer wing panel 19 as previously described. At the full retraction of fold actuator 26, the entire folding mechanism is stowed in outer panel cavity 36 (FIG. 2) as shown in FIG. 6. At this point, the span of outer wing panel is approximately perpendicular to the direction of travel and the chord is approximately vertical. Unfolding is completed by extending rotation actuator 25 (FIG. 8) to the position shown in FIG. 9 causing a rotation of rotation arm 24 and all attached components. Outer wing panel 19 and all attached components are now in the final position for aircraft operations. Attachment is completed for each wing by engaging three pins to rigidly attach the outer wing panel 19 to inner wing panel 14. Outer pin 33 is slidably inserted through outer main spar 37 (FIG. 2) and into second inner spar 35. Similarly, inner pin 41 (FIG. 4) slidably attached to first inner spar 34 is slidably inserted through outer main spar 37 and into second inner spar 35. Similarly, aft pin 42 is slidably attached to fourth inner spar 40 (FIG. 9) and is inserted through outer aft spar 38 (FIG. 3) and into third outer spar 39.

In each case, the pins that are used to attach the outer panels 19 to the interior structural components are intended to be actuated by any suitable means. In the preferred embodiment a separate linear actuator would be provided for each pin.

Aileron Control

Figure 19:
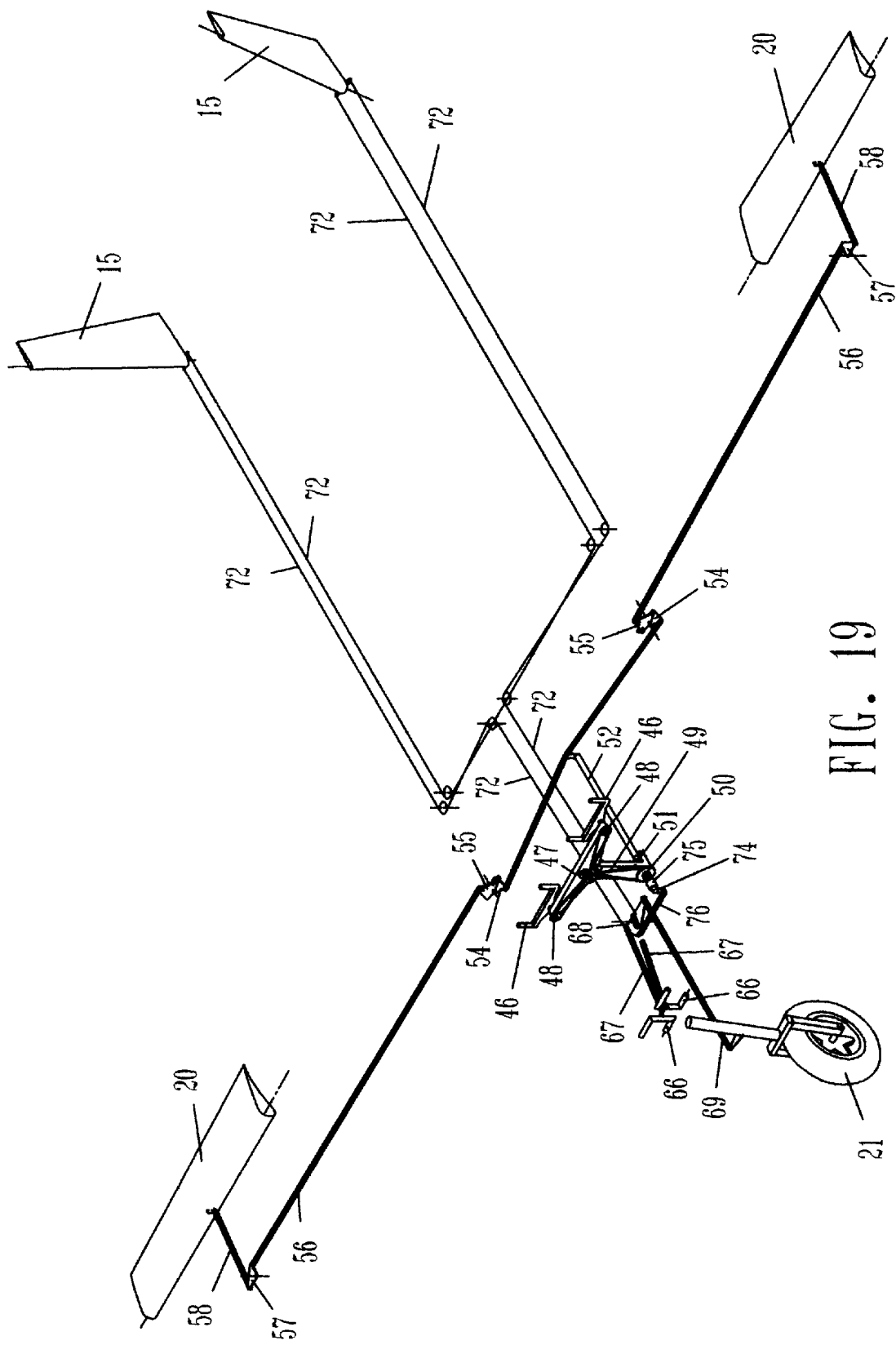
FIG. 19 is a diagrammatic perspective view of the directional and lateral controls as they exist within the vehicle assembly.
Figure 21:
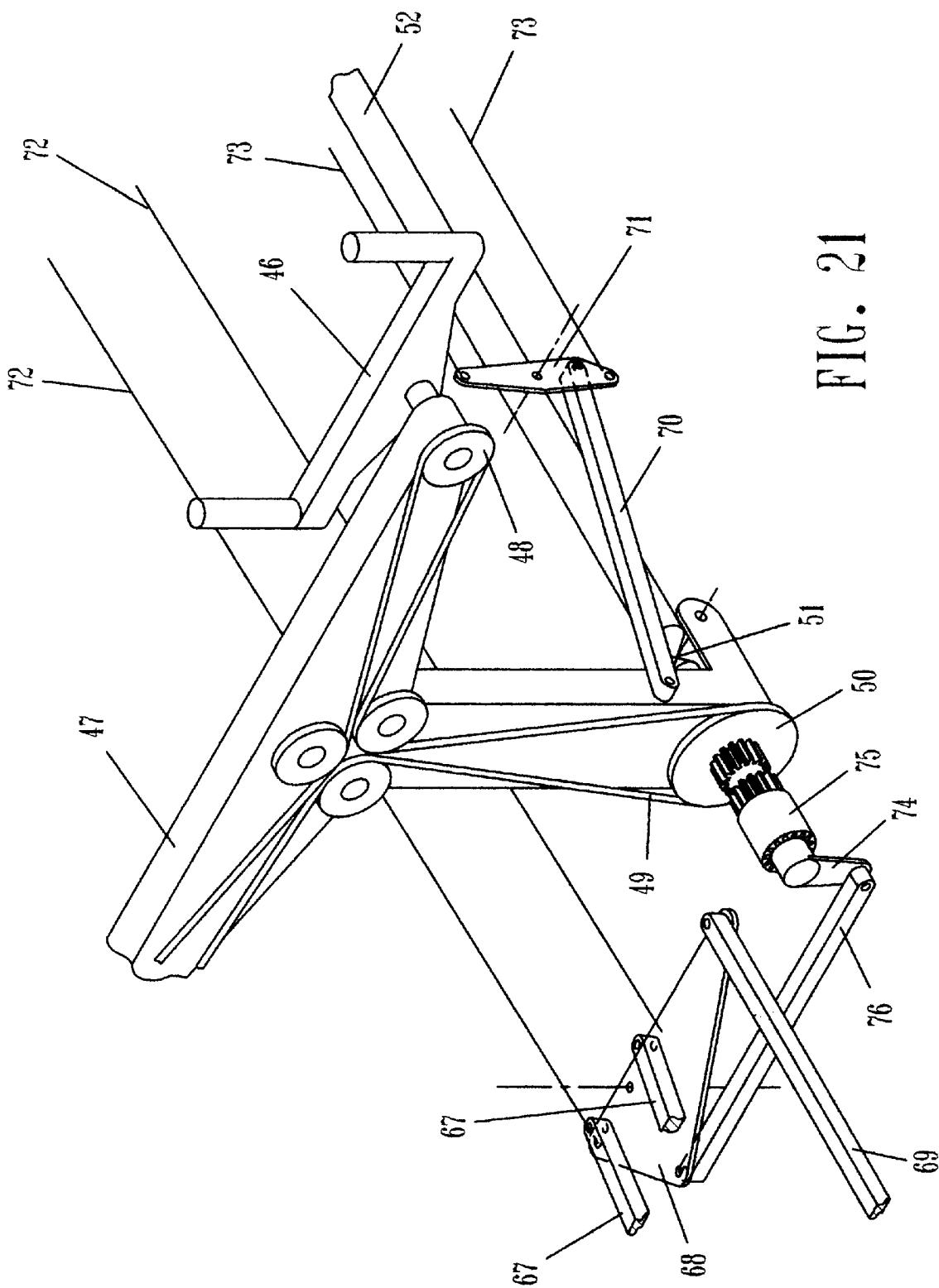
FIG. 21 is an enlarged view of the controls comprising the steering mode selection mechanism.

In the preferred embodiment, conventional mechanical elements are used to transmit control inputs from control yokes 46 to the ailerons 20. FIG. 21 shows control yokes 46 pivotally mounted to yoke post 47. Yoke post 47 is pivotally mounted to fuselage 10. Yoke sprockets 48 are rigidly mounted to control yokes 46. Rotation of yoke sprockets 48 is transmitted through yoke chain 49 to steering sprocket 50. Steering sprocket 50 is pivotally mounted to yoke post 47 and fitted with a spline type feature on the front the purpose of which will be discussed later. Universal joint 51 is rigidly mounted to the rear extension of steering sprocket 50 and with its pivot axis substantially aligned with the pivot axis of yoke post 47. Torque tube 52 is rigidly mounted to universal joint 51 at its front end and pivotally mounted to fuselage 10 at its rear end. As shown in FIG. 19, inner pushrods 53 are pivotally mounted to torque tube 52 and pivotally mounted to lower rockers 54. Lower rockers are pivotally mounted to inner wing panels 14. Upper rockers are pivotally mounted to outer wing panels 19. With outer wing panels 19 positioned for aircraft operations, motion of lower rockers 54 causes equivalent motion of upper rockers 55 as will be described later. Outer pushrods 56 are pivotally mounted to upper rockers 55 and outer aileron rockers 57. Outer aileron rockers are pivotally mounted to outer wing panels 19. Aileron pushrods 58 are pivotally mounted to outer aileron rockers 57 and ailerons 20.

Restraining Ailerons When Outer Wing Panels Are Folded for Automobile Operations FIGS. 11–13 show how intersecting protrusions fitted to lower rockers 54 and upper rockers 55 and alignment of the respective pivots causes rotation of lower rockers 54 to be transmitted to upper rockers 55 in the usual manner. Latch rockers 59 are pivotally mounted to upper rockers 55. Latch springs 60 are rigidly attached to latch rockers 59 and upper rockers 55. Latch bars 62 are pivotally mounted to latch rockers 59. Latch pins 63 are rigidly mounted to latch bars 62 and slidably mounted to upper rockers 55 in rocker slots 64. Outer pushrods 56 contain latch slots 65 that will receive latch pins 63. Prior to separation of upper rockers 55 from lower rockers 54, (FIG. 11) latch springs 60 are compressed beneath latch rockers 59 providing bias. Latch rockers 59 are prevented from rotating due to reaction on lower rocker tabs 61.

Unique to the present invention is the means by which ailerons 20 are restrained when outer wing panels 19 are folded for automobile operations. Separation of upper rockers 55 from lower rockers 54 (FIG. 12) naturally results from folding of outer wing panels 19 as previously described. This separation releases the reaction of lower rocker tabs 61 and allows latch springs 60 to rotate latch rockers 59. This rotation in turn forces latch bars 62 to slide latch pins 63 along rocker slots 64 and engage latch slots 65. With latch pins 63 engaged in both latch slots 65 and rocker slots 64, rotation of upper rockers 55 is impossible. Rotation of ailerons 20 is now prevented by connection of previously described mechanical elements. It is important to note that ailerons can only be locked when outer wing panels 19 are separated from inner wing panels 14 and therefore cannot be accidentally locked during aircraft operations. Furthermore, the locking is automatic and requires no operator attention.

Steering With Pedals

As shown in FIG. 19, steering controls for aircraft operations comprise rudder pedals 66, which are pivotally mounted to fuselage 10. Rudder pedal pushrods 67 are pivotally mounted to rudder pedals 66 at one end and pivotally mounted to steering mixing rocker 68 (FIG. 21) at the other end. Steering mixer rocker 68 is pivotally mounted to fuselage 10. Usual rudder control cables 72 are attached to steering mixer rocker 68 and route through pulleys to rudders 15. Steering pushrod 69 is pivotally mounted to steering mixer rocker 68 at one end and to lightly loaded wheel 21 at the other end. Lightly loaded wheel 21 is pivotally mounted to fuselage 10. As such, control inputs to rudder pedals 66 cause movements of both rudders 15 and lightly loaded wheel 21.

Pitch Controls for Aircraft Operations

Figure 20:
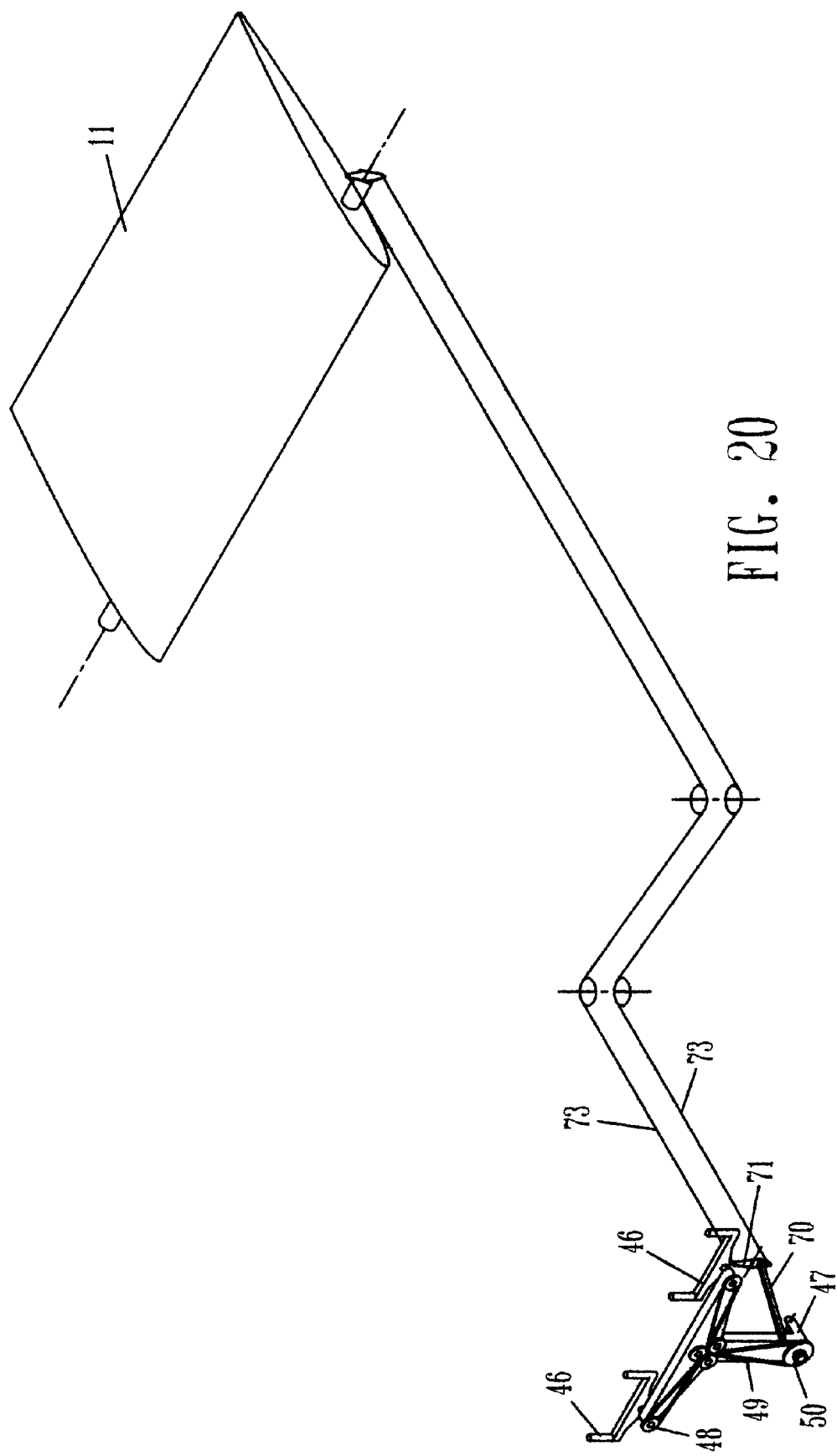
FIG. 20 is a diagrammatic perspective view of the pitch controls as they exist within the vehicle assembly.

In this preferred embodiment, pitch controls for aircraft operations utilize the same control yokes 46 and yoke post 47 described previously. Pivoting of the yoke post is transmitted through usual mechanical elements to horizontal stabilizer 11. Pitch pushrod 70 (FIG. 20) is pivotally mounted to yoke post 47. Pitch rocker 71 is pivotally mounted to fuselage 10. Usual pitch control cables 73 are routed through usual pulleys to horizontal stabilizer 11.

Steering With Yoke During Automobile Operations

For convenience, means for utilizing the yokes 46 for wheel steering while simultaneously locking the horizontal stabilizer 11 is provided. As shown in FIGS. 19 and 21, steering arm 74 is pivotally mounted to fuselage 10 in a manner that allows the rotation axis of steering sprocket 50 to be aligned with the rotation axis of steering arm 74. Steering arm 74 is fitted on the end adjacent to steering sprocket 50 with an equivalent spline type feature as that found on steering sprocket 50. Steering sleeve 75 is slidably mounted to steering arm 74 and is fitted with an internal spline type feature which will engage the corresponding spline type features on steering arm 74 and steering sprocket 50. When wheel steering through control yoke 46 inputs is desired, the pivot axis of steering sprocket 50 is aligned with the pivot axis of steering arm 74. Next, steering sleeve 75 is manually moved to engage the spline type feature of steering sprocket 50. This engagement allows rotational movements of steering sprocket 50 to be transmitted to rotational movements of steering arm 74. Steering mixing pushrod 76 is pivotally mounted to steering arm 74 at one end and pivotally mounted to steering mixing rocker 68 at the other end. When steering sleeve 75 has been engaged with steering sprocket 50 as described above, rotation of control yokes 46 causes rotation of steering arm 74 which is transmitted through steering mixing pushrod 76 causing rotation of steering mixing rocker 68. This in turn causes the desired steering motion as previously described. A further result of the engaged positioning of steering sleeve 75 is that it makes rotational movements of yoke post 47 impossible. This has the dual benefit of locking horizontal stabilizer 11 in a desirable position for automobile operations (FIG. 17) and simulating a normal non-translational steering wheel as in a typical automobile.

Drivetrain Design

Driving the Propeller for Aircraft Operations

Figure 14:
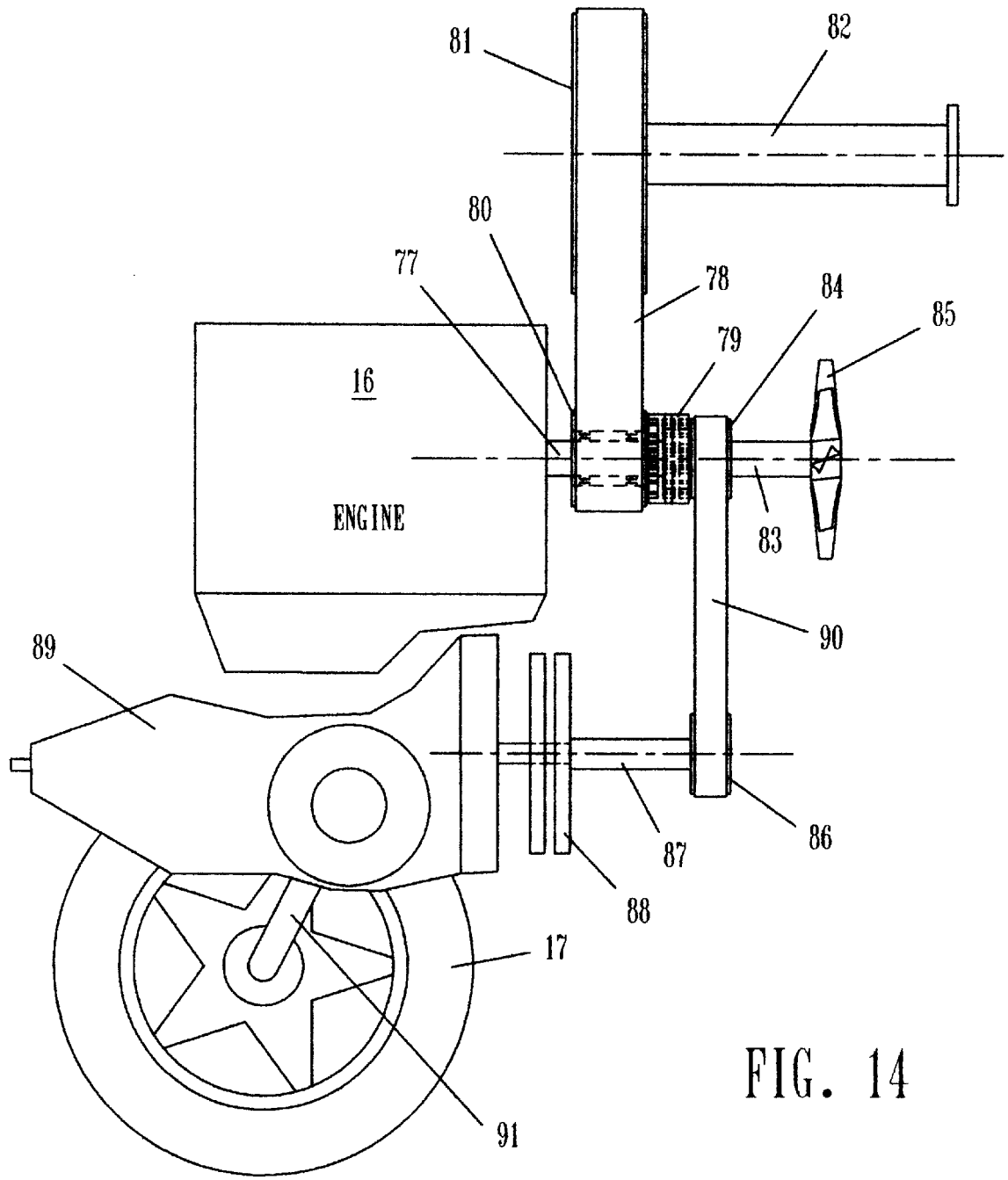
FIG. 14 is a partial fragmentary sectional side elevation taken on line 14—14 in FIG. 1 showing the preferred embodiment of the power transmission assembly.
Figure 15:
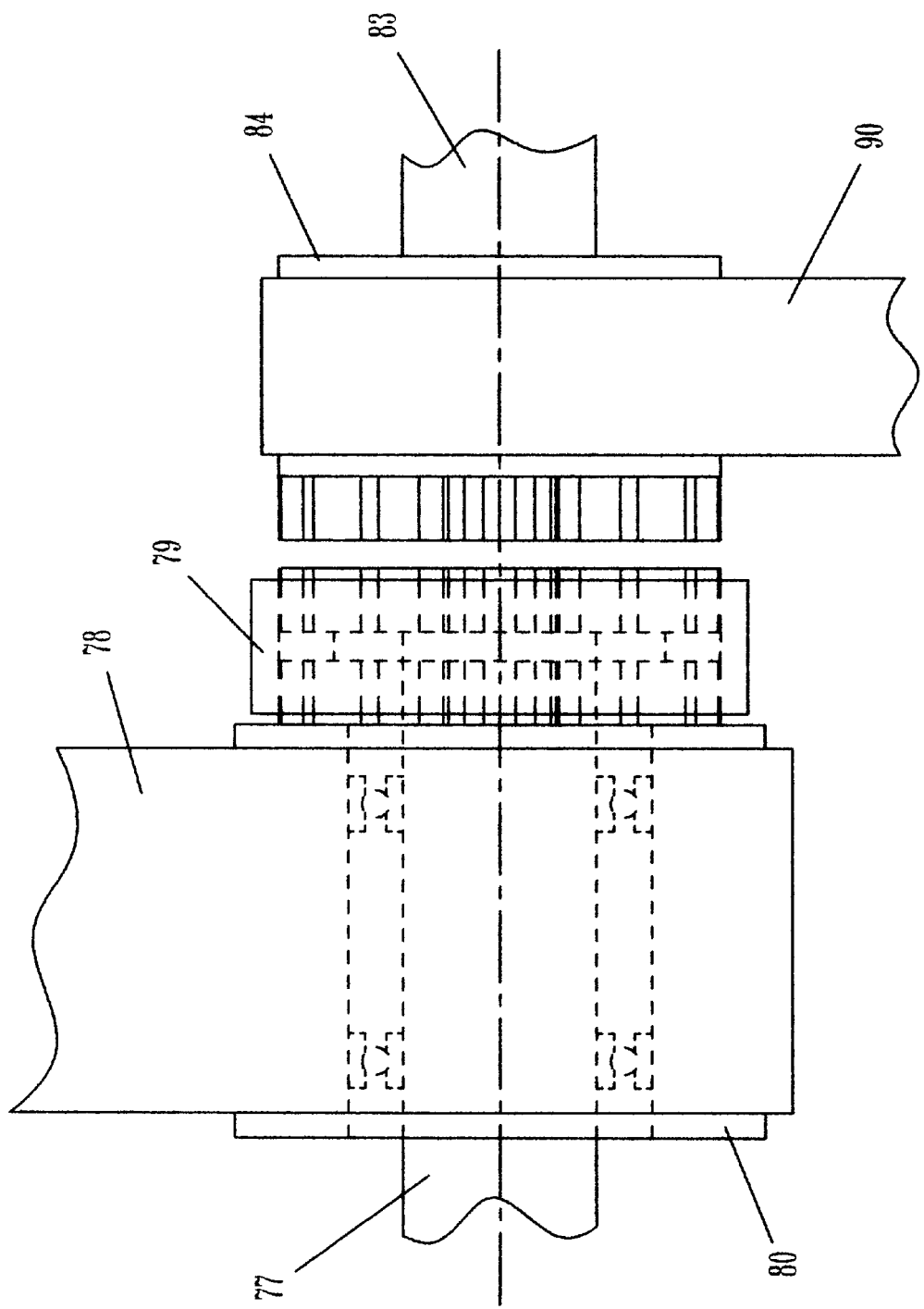
FIG. 15 is an enlarged partial elevation of the mode selection portion of the power transmission assembly.

Engine 16 is shown in FIG. 14 fitted with output shaft 77 attached to the engine crankshaft (not shown). Engine 16 is mounted to fuselage 10 using usual semi-rigid engine mounts (not shown). Output shaft 77 is sufficiently long to pass through at least one power transmission element and is terminated at its far end with a suitable spline type feature (FIG. 15). In this preferred embodiment, propeller 18 is driven through a propeller toothed belt 78 that is snugly fitted to propeller drive sprocket 80 and propeller driven sprocket 81 such that power can be transmitted. Propeller drive sprocket 80 is free to rotate on bearings (shown with dashed lines in FIGS. 14, 15) rigidly mounted on output shaft 77 and is fitted at its rear with a suitable spline type feature which is equivalent to the spline type feature fitted on output shaft 77. Drive selection sleeve 79 is slidably mounted to output shaft 77 and contains internal spline type feature suitable to engage like features on output shaft 77 and propeller drive sprocket 80. Power is transmitted from output shaft 77 to propeller drive sprocket 80 when drive selection sleeve 79 is manually engaged in the position shown in FIG. 15. Propeller driven sprocket 81 is rigidly attached to propeller shaft 82, as shown in FIG. 14. Propeller shaft 82 is free to rotate within bearings rigidly mounted to engine 16 (the bearings, bearing housings and the method of mounting to engine 16 are not shown in FIG. 14). Propeller 18 is rigidly attached to propeller shaft 82.

Driving the Wheels for Automobile Operations

Fan shaft 83 is free to rotate within bearings (not shown) rigidly mounted to engine 16 and its rotational axis is aligned with the rotational axis of output shaft 77. In this preferred embodiment, transaxle drive sprocket 84 is rigidly attached to fan shaft 83 and is fitted with equivalent spline type feature to that on output shaft 77 on the side adjacent to output shaft 77. Clutch shaft 87 is free to rotate within usual bearings (not shown) rigidly attached to engine 16. Transaxle driven sprocket 86 is rigidly attached to clutch shaft 87. Transaxle toothed belt 90 is snugly fitted around transaxle drive sprocket 84 and transaxle driven sprocket 86 such that power can be transmitted. Clutch 88 is rigidly attached to clutch shaft 87. Transaxle 89 is rigidly attached to engine 16 and engages clutch 88. Transaxle 89 serves the combined and usual functions of transmission and differential providing power to usual drive axles 91. Drive axles 91 are attached to transaxle 89 and main load bearing wheels 17 through universal joints (not shown) at each end. Main load bearing wheels 17 are attached to fuselage 10 through compliant suspension (not shown). When automobile operations are selected, drive selection sleeve 79 is slidably displaced along output shaft 77 until disengaged from propeller drive sprocket 80 and alternately engaged onto equivalent spline type feature on transaxle drive sprocket 84 (FIG. 14). Power is hence transmitted through clutch 88 and transaxle 89 to the main load bearing wheels 17. Automobile operation is now consistent with standard practice where the clutch 88 is used to engage or disengage the engine from the transaxle 89 and speed ratio is selectable within the transaxle 89.

Engine Cooling

Engine cooling fan 85 is rigidly attached to the aft end of fan shaft 83. Additional benefit is realized through the uninterrupted rotation of engine cooling fan 85 during automobile operations providing sufficient engine cooling air flow even without the vehicle being in motion. Sufficient cooling air is provided during aircraft operations by usual air scoop 97 (FIG. 1) combined with vehicle motion.

Decoupling of Automobile Components During Aircraft Operations

Additional benefit is also achieved wherein all power transmission components used exclusively for automobile operations are fully decoupled from those power transmission components used exclusively for aircraft operations during aircraft operations. This eliminates the possibility of a failure during aircraft operations of any power transmission component used exclusively for automobile operations and improves safety during aircraft operations.

Center of Gravity and Center of Pressure

Figure 17:
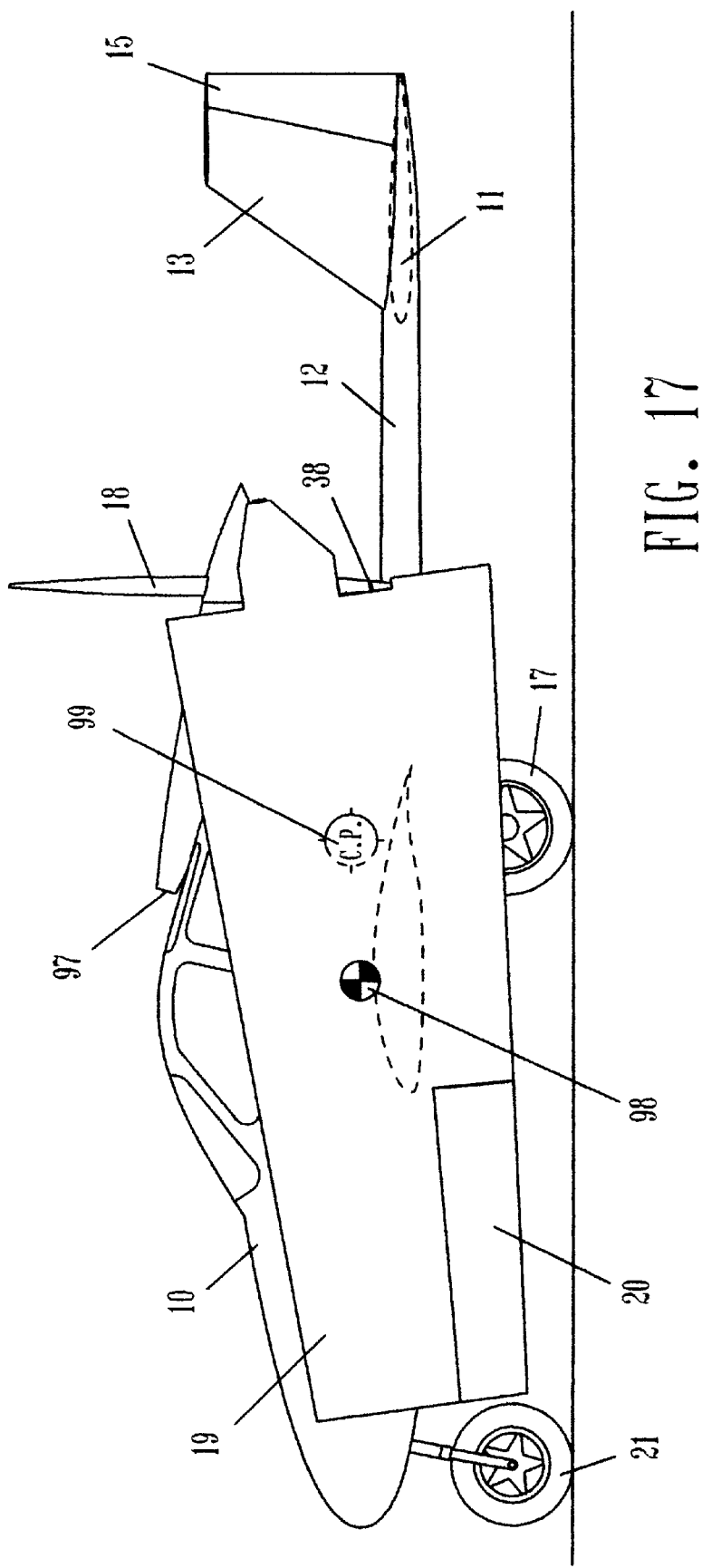
FIG. 17 is a side elevation of a complete vehicle assembly configured for highway operation wherein the arrangement of the center of gravity, center of pressure, and locked horizontal stabilizer may be depicted.
Figure 18:
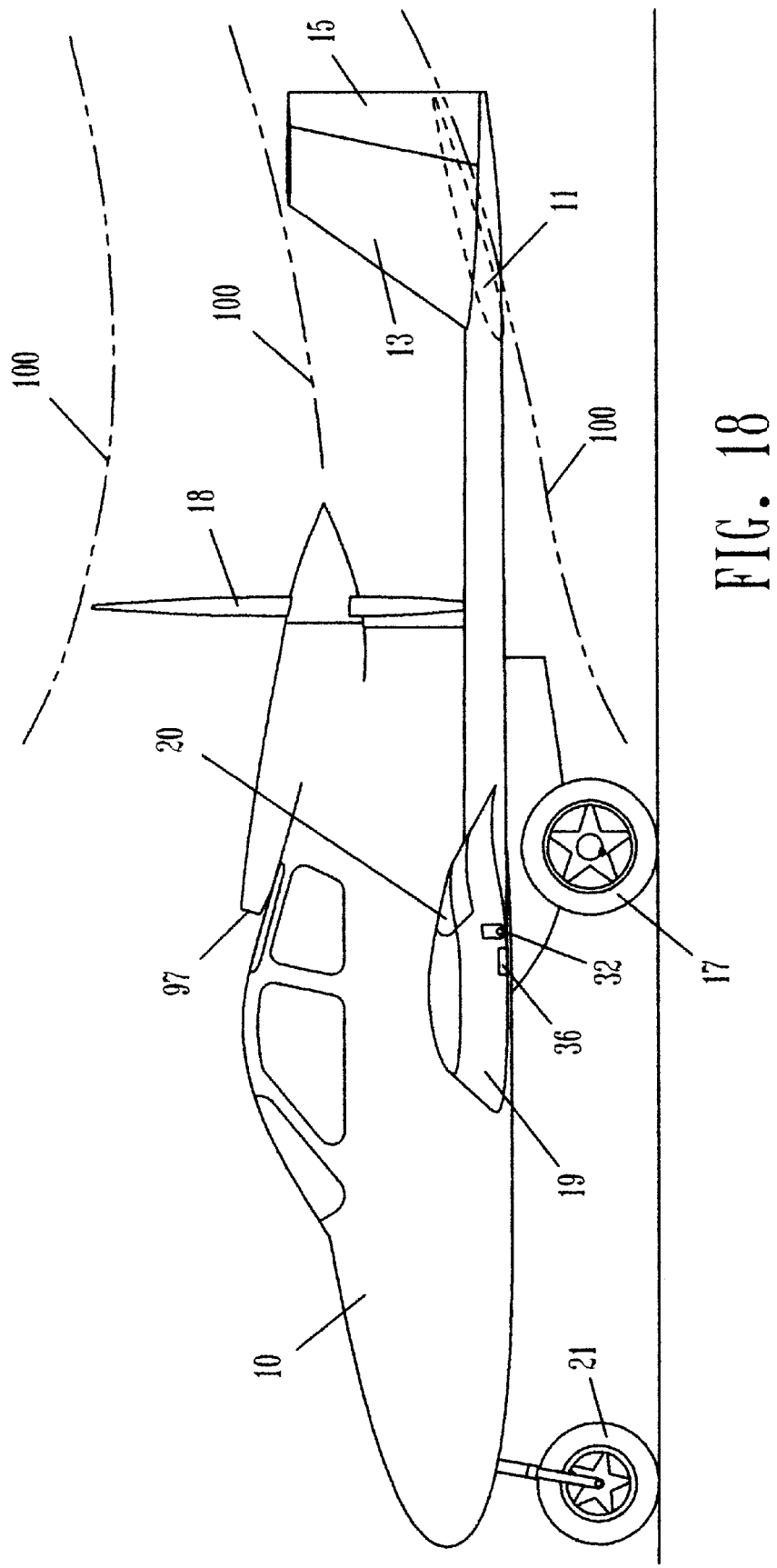
FIG. 18 is a side elevation of a complete vehicle assembly configured for aircraft operation wherein the deflection of the propeller slipstream for takeoff rotation assistance is depicted.

Driving stability in automobile operations is enhanced by appropriate location of the center of gravity 98 as shown in FIG. 17. The center of gravity must be sufficiently forward of the main load bearing wheels 17 to provide tipping resistance during acceleration and simultaneously apply adequate force on the lightly loaded wheel 21 for reliable steering. Also critical is the positioning of the folded outer wing panels 19 in a position where the center of pressure 99 (denoted C.P. in FIG. 17) of the overall automobile assembly due to wind approaching from approximately ninety degrees to the direction of travel is located near the main load bearing wheels 17. The benefit being that crosswind normally encountered while driving will not cause unacceptable yawing forces on the assembly. There is a negative result of placing the center of gravity forward of the main load bearing wheels. Lifting of the nose during takeoff becomes more difficult. It is for this reason that the assembly is configured with propeller 18 positioned immediately ahead of horizontal stabilizer 11. In the preferred embodiment, horizontal stabilizer 11 is pivotally attached to tail structures 12 as previously stated such that large deflection of the propeller slipstream 100 (shown as dashed lines in FIG. 18) can be effected. This slipstream deflection causes sufficient nose rotation moment to overcome the center of gravity 98 position forward of the main load bearing wheels 17. In an alternate embodiment, horizontal stabilizer 11 could be rigidly fixed to tail structures 12 and fitted with hinged elevator (not shown) as previously stated. This configuration would also cause significant propeller slipstream 100 deflection but would not be as effective.

Other Embodiments

Alternate Wing Folding Embodiment

In an alternate embodiment, phasing link 31 and the associated components used to rotate outer wing panel 19 as described above could be replaced by a system shown in FIG. 23 which uses any suitable flexible tensile member such as toothed belt or chain and common sprockets to achieve phased rotation as follows. Pivot sprocket 43 is rigidly attached to pivot shaft 22. Fixed sprocket 44 is rigidly attached to rotation arm 24. Chainlike element 45 is fitted snugly around both pivot sprocket 43 and fixed sprocket 44 and engages teeth to prevent relative motion between chainlike element 45 and either sprocket 43 or sprocket 44. Rotation of fold arm 23 will hence cause a corresponding rotation of pivot shaft 22 and therefore outer wing panel 19. By suitable sizing of the sprockets, the desired phasing relationship can be achieved.

Alternate Ground Drive Components

In an alternate embodiment, transaxle 89 and all associated ground drive components could be replaced by a hydrostatic drive comprising usual hydraulic pump 92 (FIG. 16) driving hydraulic motors (not shown) attached directly to main load bearing wheels 17. Hydraulic pump 92 would be rigidly attached to engine 16. Engine cooling fan 85 would be rigidly attached to pump shaft 93 of hydraulic pump 92. Pump shaft 93 would have its rotational axis aligned with the rotational axis of output shaft 77 and would be fitted with equivalent spline type feature to allow engagement of drive selection sleeve 79.

Alternate Propeller Drive Components

Figure 16:
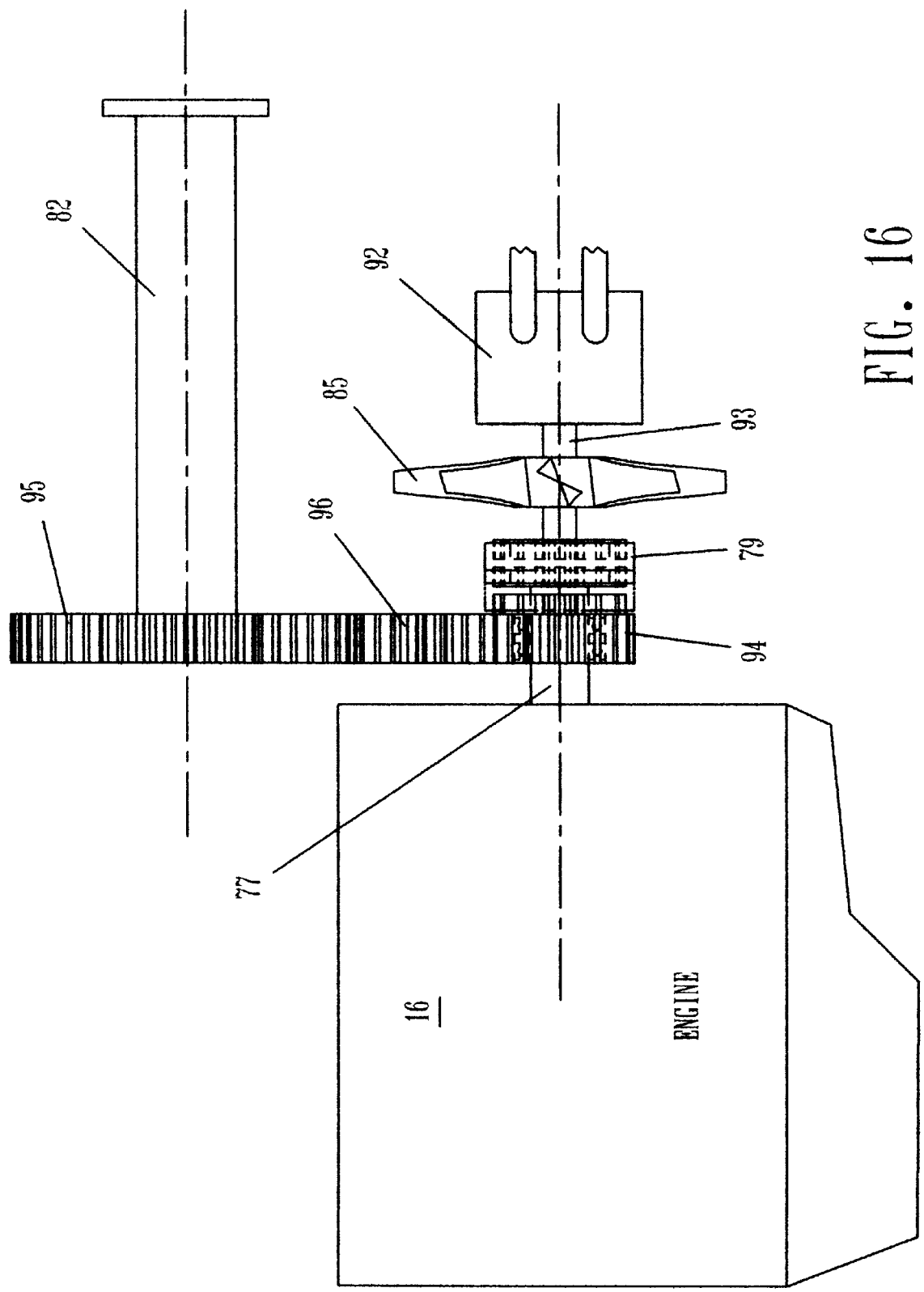
FIG. 16 is an enlarged partial elevation of the power transmission assembly showing an alternate embodiment.

In another alternate embodiment, propeller toothed belt 78 and associated sprockets 80 and 81 would be replaced by gears (FIG. 16). Propeller drive gear 94 would replace propeller drive sprocket 80 and would be similarly rotationally attached to output shaft 77. Propeller driven gear 95 would replace propeller driven sprocket 81 and would be rigidly attached to propeller shaft 82. Any number (including zero) of idler gears 96 could be used to achieve the desired power transmission configuration.

Alternate Embodiments of Empennage

Figure 24:
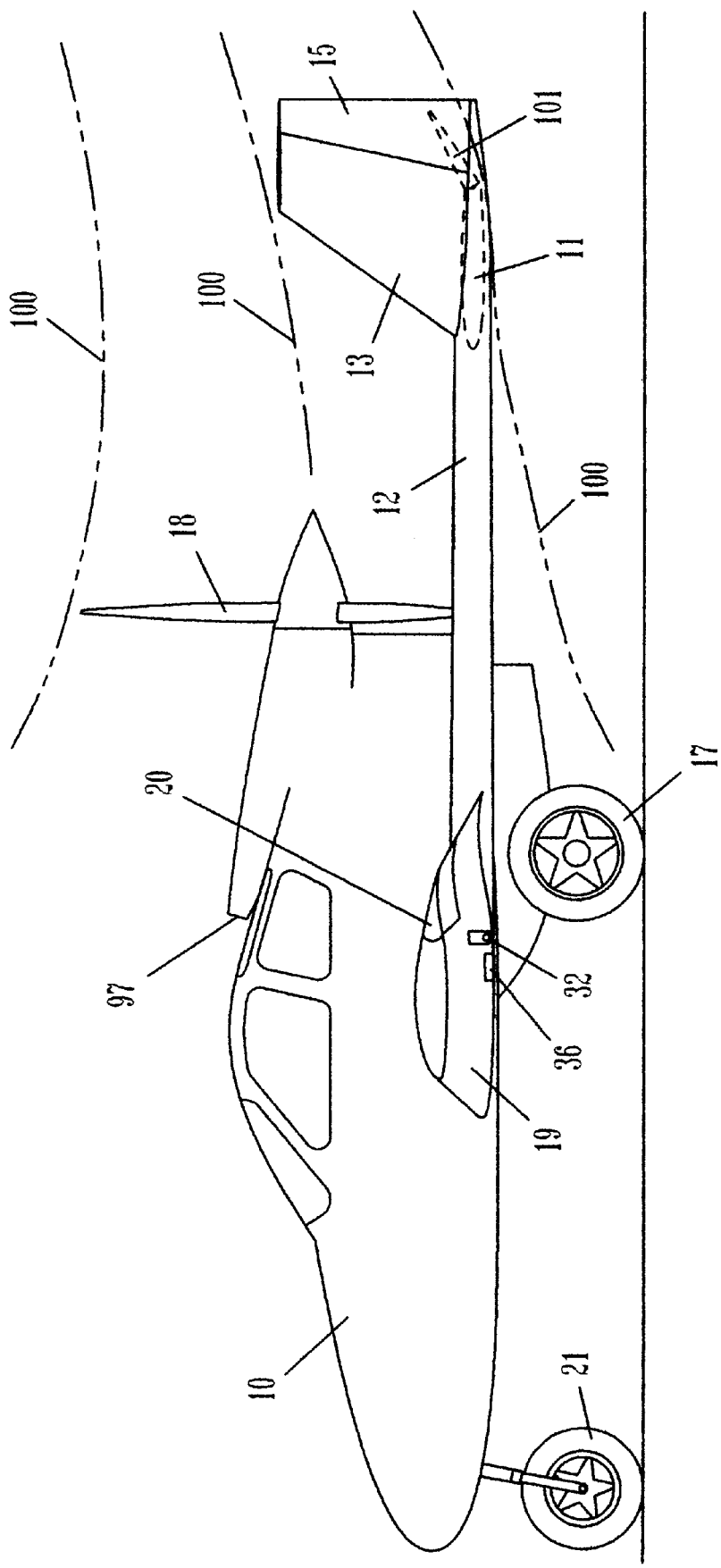
FIG. 24 shows an elevator hinged to the horizontal stabilizer with the horizontal stabilizer rigidly mounted to the tail structure.

In the preferred embodiment, horizontal stabilizer 11 is pivotally mounted to tail structures 12. However, in an alternate embodiment, elevator 101 could be hinged to horizontal stabilizer 11 with horizontal stabilizer 11 rigidly mounted to tail structures 12, as shown in FIG. 24. Also, in the preferred embodiment, tail structures 12 are rigidly attached to wing panels 14. In an alternate embodiment, tail structures 12 could be attached directly to fuselage 10. Also, tail structures 12 could be a single boom passing above or below propeller 18. In this embodiment, a single tail structure 12 would have horizontal stabilizer 11 fitted at any appropriate location on tail structure 12 or stabilizer 13.

Other Embodiments and Modifications

Although only ailerons 20 are depicted here, other moveable control surfaces, such as flaps, are also possible. Also, although the preferred embodiment discloses the utilization of two inner main spars 34 and 35, an outer main spar 37, and a connecting pin for locking outer wing panels 19, it is also possible to use just one inner main spar.

Persons skilled in this art will recognize many other changes and modifications which can be made to the present invention without departing from its spirit. Therefore, the scope of the present invention is to be determined by the appended claims and their legal equivalents.

I claim:

1. A roadable aircraft capable of aircraft operations and automobile operations, comprising:
   A) a fuselage comprising an engine with an engine shaft and defining a travel direction,
   B) a propeller,
   C) at least one load bearing drive wheel,
   D) two wings each of which comprise an inner wing panel and an outer wing panel,
   E) a fold mechanism in each wing for rotating each of said outer wing panels from a substantially horizontal extended flying position to a substantially vertical extended position and then folding each of said outer wing panels into a direction parallel to said travel direction,
   F) a selectable drive mechanism for alternately driving from said engine shaft said propeller or said drive wheel as selected by an operator,
   G) at least one yoke for controlling said ailerons during said aircraft operations and at least one wheel for steering during said automobile operations,
   H) rudder pedals for controlling rudders and said at least one wheel for steering,
   I) a yoke post for controlling a horizontal stabilizer, wherein said yoke post is pivotally mounted to said fuselage, wherein said at least one yoke is pivotally mounted to said yoke post, and
   J) a switching means for switching said control of said one wheel for steering to said at least one yoke during said automobile operations.

2. A roadable aircraft capable of aircraft operations and automobile operations, comprising:
   A) a fuselage comprising an engine with an engine shaft and defining a travel direction,
   B) a propeller,
   C) at least one load bearing drive wheel,
   D) two wings each of which comprise an inner wing panel and an outer wing panel, wherein said outer wing panel comprises a first end, wherein said first end of said outer wing panel is attached to said inner wing panel when positioned in said substantially horizontal extended flying position,
   E) a fold mechanism in each wing for rotating each of said outer wing panels from a substantially horizontal extended flying position to a substantially vertical extended position and then folding each of said outer wing panels into a direction parallel to said travel direction, wherein said first end of said outer wing panel is substantially displaced in said travel direction after said folding of said each of said outer wing panels into a direction parallel to said travel direction, and F) a selectable drive mechanism for alternately driving from said engine shaft said propeller or said drive wheel as selected by an operator.

3. The roadable aircraft as in claim 2, wherein said fold mechanism comprises:

A) a rotation arm pivotally mounted to said inner wing panel,

B) a rotation actuator comprising a first end and second end, wherein said rotation actuator is pivotally mounted to said fuselage at said first end of said rotation actuator and pivotally mounted to said rotation arm at said second end of said rotation actuator, C) a fold arm comprising a first end and second end, wherein said fold arm is pivotally mounted to said rotation arm at said first end of said fold arm, D) a pivot shaft rigidly attached to said outer wing panel, wherein said fold arm is pivotally mounted to said pivot shaft at said second end of said fold arm, E) a fold actuator comprising a first end and second end, wherein said fold actuator is pivotally mounted to said rotation arm at said first end of said fold actuator and said fold actuator is pivotally mounted to said fold arm at said second end of said fold actuator, F) a phasing link comprising a first end and a second end, wherein said phasing link is pivotally mounted to said rotation arm at said first end of said phasing link, G) a phasing arm comprising a first end and a second end, wherein said phasing link is pivotally mounted to said first end of said phasing arm at said second end of said phasing link, H) a phasing shaft wherein said phasing arm is rigidly attached to said phasing shaft at said second end of said phasing arm, I) a phasing gear rigidly connected to said phasing shaft, and J) a pivot shaft gear engaged with said phasing gear and rigidly connected to said pivot shaft, wherein the ratio of said pivot shaft gear to said phasing gear is approximately 1:2, wherein said folded position and said unfolded position occurs through actuation of said rotation actuator and said fold actuator, wherein as said fold arm undergoes angular rotation clockwise around said pivot connection at said rotation arm, said outer wing panel undergoes angular rotation counterclockwise around said pivot shaft at a value of substantially twice said angular rotation of said fold arm.

4. The roadable aircraft as in claim 2, wherein said fold mechanism comprises:

A) a rotation arm pivotally mounted to said inner wing panel,

B) a rotation actuator comprising a first end and second end, wherein said rotation actuator is pivotally mounted to said fuselage at said first end of said rotation actuator and pivotally mounted to said rotation arm at said second end of said rotation actuator, C) a fold arm comprising a first end and second end, wherein said fold arm is pivotally mounted to said rotation arm at said first end of said fold arm, D) a pivot shaft rigidly attached to said outer wing panel, wherein said fold arm is pivotally mounted to said pivot shaft at said second end of said fold arm, E) a fold actuator comprising a first end and second end, wherein said fold actuator is pivotally mounted to said rotation arm at said first end of said fold actuator and said fold actuator is pivotally mounted to said fold arm at said second end of said fold actuator, F) a pivot sprocket rigidly connected to said pivot shaft, G) a fixed sprocket rigidly connected to said rotation arm, wherein said ratio of said pivot sprocket to said fixed sprocket is approximately 1:2, and H) a chainlike element fitted snugly around said pivot sprocket and fixed sprocket, wherein said folded position and said unfolded position occurs through actuation of said rotation actuator and said fold actuator, wherein as said fold arm undergoes angular rotation clockwise around said pivot connection at said rotation arm, said outer wing panel undergoes angular rotation counterclockwise around said pivot shaft at a value of substantially twice said angular rotation of said fold arm.

5. The roadable aircraft as in claim 2, further comprising a locking means to lock said outer wing panels in said folded position and said unfolded position.

6. The roadable aircraft as in claim 5, wherein said locking means comprises:

A) a latch element connected to the bottom surface of said outer wing panel,

B) an outer main spar connected to the inside edge of said outer wing panel,

C) at least one main inner spar connected to the outside edge of said inner wing panel, and D) at least one connecting pin slidably connected to one of said at least one inner main spar, wherein said connecting pin is inserted through said latch element and through the other one of said at least one inner main spar to lock said outer wing panel in said folded position, wherein said connecting pin is inserted through said outer main spar and through said other one of said at least one inner main spar to lock said outer wing panel in said unfolded position.

7. The roadable aircraft as in claim 2, wherein said outer wing panel comprises:

A) a moveable control surface, and

B) a restraining means for restraining said moveable control surface when said outer wing panels are in said folded position.

8. The roadable aircraft as in claim 7, wherein said moveable control surface is an aileron.

9. The roadable aircraft as in claim 7, wherein said restraining means comprises:

A) an outer pushrod comprising a latch slot,

B) an upper rocker comprising a rocker slot, wherein said upper rocker is pivotally mounted to said outer pushrod and said outer wing panel, C) a lower rocker pivotally mounted to said inner wing panel, D) a lower rocker tab rigidly mounted to said lower rocker, E) a latch rocker pivotally mounted to said upper rocker, F) a latch spring rigidly connected to said latch rocker and said upper rocker, wherein said latch spring under compression provides a bias forcing said latch rocker tight against said lower rocker tab, G) a latch bar pivotally connected to said latch rocker, and H) a latch pin rigidly connected to said latch bar and positioned in said rocker slot in said unfolded position, wherein in said folded position, said lower rocker is automatically separated from said upper rocker and wherein said lower rocker tab bias is broken, wherein said latch pin is automatically slidably positioned in said latch slot to prevent rotation of said moveable control surface.

10. The roadable aircraft as in claim 8, wherein said restraining means comprises:

A) an outer pushrod comprising a latch slot,

B) an upper rocker comprising a rocker slot, wherein said upper rocker is pivotally mounted to said outer pushrod and said outer wing panel, C) a lower rocker pivotally mounted to said inner wing panel, D) a lower rocker tab rigidly mounted to said lower rocker, E) a latch rocker pivotally mounted to said upper rocker, F) a latch spring rigidly connected to said latch rocker and said upper rocker, wherein said latch spring under compression provides a bias forcing said latch rocker tight against said lower rocker tab, G) a latch bar pivotally connected to said latch rocker, and H) a latch pin rigidly connected to said latch bar and positioned in said rocker slot in said unfolded position,, wherein in said folded position, said lower rocker is automatically separated from said upper rocker and wherein said lower rocker tab bias is broken, wherein said latch pin is automatically slidably positioned in said latch slot to prevent rotation of said aileron.

11. The roadable aircraft as in claim 2, wherein said selectable drive mechanism comprises:

A) an output shaft connected to the crankshaft of said engine at a first end and comprising a spline at its second end, B) propeller drive sprocket bearings rigidly mounted on said output shaft, C) a propeller drive sprocket for channeling power through an aircraft channeling means to said assembly's propeller during said aircraft operations, wherein said propeller drive sprocket is mounted on said bearings and free to rotate on said bearings and comprising a spline, D) a second shaft rotationally mounted adjacent to said output shaft, wherein the rotational axis of said second shaft is aligned with the rotation axis of said output shaft E) a transaxle drive sprocket for channeling power through an automobile channeling means to said assembly's drive wheels during said automobile operations comprising a spline, wherein said transaxle drive sprocket is rigidly connected to said second shaft, F) a drive selection sleeve slidably mounted to said output shaft comprising a spline receptacle to engage said spline on said propeller drive sprocket and said spline on said transaxle drive shaft, wherein during said aircraft operations, said drive selection sleeve slidably engages said spline on said propeller drive sprocket, wherein during said automobile operations, said drive selection sleeve slidably engages said spline on said transaxle drive sprocket.

12. The roadable aircraft as in claim 11, wherein said second shaft is a fan shaft, wherein said fan shaft comprises:

A) said transaxle drive sprocket at the first end of said fan shaft,

B) a engine cooling fan at the second end of said fan shaft, wherein said engine cooling fan is powered when said drive selection sleeve is engaged to said transaxle drive sprocket.

13. The roadable aircraft as in claim 11, wherein said aircraft channeling means comprises:

A) a propeller driven sprocket,

B) a propeller-toothed belt engaging said propeller drive sprocket and said propeller driven sprocket, and C) a propeller shaft rigidly connected to said propeller driven sprocket at a first end and said propeller at a second end.

14. The roadable aircraft as in claim 11, wherein said propeller drive sprocket is a propeller drive gear and wherein said aircraft channeling means comprises:

A) a propeller driven gear,

B) at least one idler gear engaged with said propeller driven gear and said propeller drive gear, C) a propeller shaft rigidly connected to said propeller driven gear at a first end and said propeller at a second end.

15. The roadable aircraft as in claim 11 wherein said propeller drive sprocket is a propeller drive gear and wherein said aircraft channeling means comprises:

A) a propeller driven gear engaged with said propeller drive gear,

B) a propeller shaft rigidly connected to said propeller driven gear at a first end and said propeller at a second end.

16. The roadable aircraft as in claim 11, wherein said automobile channeling means comprises:

A) a transaxle driven sprocket,

B) a transaxle toothed belt engaged with said transaxle driven sprocket and said transaxle drive sprocket, C) a clutch shaft rigidly connected to said transaxle driven sprocket, D) a clutch rigidly connected to said clutch shaft, E) a transaxle engaged with said clutch, wherein said transaxle functions as differential and transmission, and F) drive axles attached to said transaxle through universal joints and connected to main load bearing wheels through universal joints.

17. The roadable aircraft as in claim 2, wherein said selectable drive mechanism comprises:

A) an output shaft connected to the crankshaft of said engine at a first end and comprising a spline at its second end, B) propeller drive sprocket bearings rigidly mounted on said output shaft, C) a propeller drive sprocket for channeling power through an aircraft channeling means to said assembly's propeller during said aircraft operations, wherein said propeller drive sprocket is mounted on said bearings and free to rotate on said bearings and comprising a spline, D) a pump shaft rotationally mounted adjacent to said output shaft, wherein the rotational axis of said pump shaft is aligned with the rotation axis of said output shaft, wherein said pump shaft comprises a first and second end comprising a spline rigidly connected at said pump shaft's first end, E) a hydraulic pump rigidly connected to said pump shaft's second end, F) an engine cooling fan rigidly connected to said pump shaft for providing engine cooling during said automobile operations, G) a drive selection sleeve slidably mounted to said output shaft comprising a spline receptacle to engage said spline on said propeller drive sprocket and said spline on said pump shaft, wherein during said aircraft operations, said drive selection sleeve slidably engages said spline on said propeller drive sprocket, wherein during said automobile operations, said drive selection sleeve slidably engages said spline on said pump shaft.

18. The roadable aircraft as in claim 2, further comprising:
   A) at least one yoke for controlling said ailerons during said aircraft operations and at least one wheel for steering during said automobile operations,
   B) rudder pedals for controlling rudders and said at least one wheel for steering,
   C) a yoke post for controlling a horizontal stabilizer, wherein said yoke post is pivotally mounted to said fuselage, wherein said at least one yoke is pivotally mounted to said yoke post, and
   D) a switching means for switching said control of said one wheel for steering to said at least one yoke during said automobile operations.

19. The roadable aircraft as in claim 18, wherein said switching means comprises:
   A) a steering mixer rocker for transmitting steering signals from said rudder pedals and said at least one yoke to said at least one wheel for steering, wherein said steering mixer rocker is pivotally mounted to said fuselage,
   B) a steering sprocket comprising a spline, wherein said steering sprocket is pivotally mounted to said yoke post,
   C) a steering arm comprising a spline, wherein said steering arm is pivotally mounted to said fuselage,
   D) a steering mixer pushrod defining a first end and a second end, wherein said steering mixer pushrod is pivotally mounted to said steering arm at said first end and said steering mixer rocker at said second end, and
   E) a steering sleeve, slidably engaged to said spline on said steering arm at all times and slidably engaged to said spline on said steering sprocket when said control of said at least one wheel for steering is through said at least one yoke.

20. A roadable aircraft capable of aircraft operations and automobile operations, comprising:
   A) a fuselage comprising an engine with an engine shaft and defining a travel direction,
   B) a propeller,
   C) at least one load bearing drive wheel,
   D) two wings each of which comprise an inner wing panel and an outer wing panel,
   E) a fold mechanism in each wing for rotating each of said outer wing panels from a substantially horizontal extended flying position to a substantially vertical extended position and then folding each of said outer wing panels into a direction parallel to said travel direction,
   F) a selectable drive mechanism for alternately driving from said engine shaft said propeller or said drive wheel as selected by an operator, and
   G) at least one wheel for steering located forward of said at least one load bearing drive wheel,
wherein the center of gravity of said roadable aircraft is sufficiently forward of said at least one load bearing drive wheel to provide tipping resistance during acceleration and simultaneously apply adequate force on said at least one wheel for steering for reliable steering.

21. A roadable aircraft capable of aircraft operations and automobile operations, comprising:
   A) a fuselage comprising an engine with an engine shaft and defining a travel direction,
   B) a propeller and at least one load bearing drive wheel,
   C) two wings each of which comprise an inner wing panel and an outer wing panel, wherein said outer wing panel comprises a first end, wherein said first end of said outer wing panel is attached to said inner wing panel when positioned in said substantially horizontal extended flying position,
   D) a fold means in each wing for rotating each of said outer wing panels from a substantially horizontal extended flying position to a substantially vertical extended position and then folding each of said outer wing panels into a direction parallel to said travel direction, wherein said first end of said outer wing panel is substantially displaced in said travel direction after said folding of said each of said outer wing panels into a direction parallel to said travel direction, and
   E) a selectable drive means for alternately driving from said engine shaft said propeller or said drive wheel as selected by an operator.

22. The roadable aircraft as in claim 21, wherein said fold means comprises:
   A) a rotation arm pivotally mounted to said inner wing panel,
   B) a rotation actuator comprising a first end and second end, wherein said rotation actuator is pivotally mounted to said fuselage at said first end of said rotation actuator and pivotally mounted to said rotation arm at said second end of said rotation actuator,
   C) a fold arm comprising a first end and second end, wherein said fold arm is pivotally mounted to said rotation arm at said first end of said fold arm,
   D) a pivot shaft rigidly attached to said outer wing panel, wherein said fold arm is pivotally mounted to said pivot shaft at said second end of said fold arm,
   E) a fold actuator comprising a first end and second end, wherein said fold actuator is pivotally mounted to said rotation arm at said first end of said fold actuator and said fold actuator is pivotally mounted to said fold arm at said second end of said fold actuator,
   F) a phasing link comprising a first end and a second end, wherein said phasing link is pivotally mounted to said rotation arm at said first end of said phasing link,
   G) a phasing arm comprising a first end and a second end, wherein said phasing link is pivotally mounted to said first end of said phasing arm at said second end of said phasing link,
   H) a phasing shaft wherein said phasing arm is rigidly attached to said phasing shaft at said second end of said phasing arm,
   I) a phasing gear rigidly connected to said phasing shaft, and
   J) a pivot shaft gear engaged with said phasing gear and rigidly connected to said pivot shaft, wherein the ratio of said pivot shaft gear to said phasing gear is approximately 1:2,
wherein said folded position and said unfolded position occurs through actuation of said rotation actuator and said fold actuator, wherein as said fold arm undergoes angular rotation clockwise around said pivot connection at said rotation arm, said outer wing panel undergoes angular rotation counterclockwise around said pivot shaft at a value of substantially twice said angular rotation of said fold arm.

23. The roadable aircraft as in claim 21, wherein said fold means comprises:
   A) a rotation arm pivotally mounted to said inner wing panel,
   B) a rotation actuator comprising a first end and second end, wherein said rotation actuator is pivotally mounted to said fuselage at said first end of said rotation actuator and pivotally mounted to said rotation arm at said second end of said rotation actuator,
   C) a fold arm comprising a first end and second end, wherein said fold arm is pivotally mounted to said rotation arm at said first end of said fold arm,
   D) a pivot shaft rigidly attached to said outer wing panel, wherein said fold arm is pivotally mounted to said pivot shaft at said second end of said fold arm,
   E) a fold actuator comprising a first end and second end, wherein said fold actuator is pivotally mounted to said rotation arm at said first end of said fold actuator and said fold actuator is pivotally mounted to said fold arm at said second end of said fold actuator,
   F) a pivot sprocket rigidly connected to said pivot shaft,
   G) a fixed sprocket rigidly connected to said rotation arm, wherein said ratio of said pivot sprocket to said fixed sprocket is approximately 1:2, and
   H) a chainlike element fitted snugly around said pivot sprocket and fixed sprocket,
wherein said folded position and said unfolded position occurs through actuation of said rotation actuator and said fold actuator, wherein as said fold arm undergoes angular rotation clockwise around said pivot connection at said rotation arm, said outer wing panel undergoes angular rotation counterclockwise around said pivot shaft at a value of substantially twice said angular rotation of said fold arm.

24. The roadable aircraft as in claim 21, wherein said selectable drive means comprises:
   A) an output shaft connected to the crankshaft of said engine at a first end and comprising a spline at its second end,
   B) propeller drive sprocket bearings rigidly mounted on said output shaft,
   C) a propeller drive sprocket for channeling power through an aircraft channeling means to said assembly's propeller during said aircraft operations, wherein said propeller drive sprocket is mounted on said bearings and free to rotate on said bearings and comprising a spline,
   D) a second shaft rotationally mounted adjacent to said output shaft, wherein the rotational axis of said second shaft is aligned with the rotation axis of said output shaft
   E) a transaxle drive sprocket for channeling power through an automobile channeling means to said assembly's drive wheels during said automobile operations comprising a spline, wherein said transaxle drive sprocket is rigidly connected to said second shaft,
   F) a drive selection sleeve slidably mounted to said output shaft comprising a spline receptacle to engage said spline on said propeller drive sprocket and said spline on said transaxle drive shaft,
wherein during said aircraft operations, said drive selection sleeve slidably engages said spline on said propeller drive sprocket, wherein during said automobile operations, said drive selection sleeve slidably engages said spline on said transaxle drive sprocket.

25. The roadable aircraft as in claim 24, wherein said second shaft is a fan shaft, wherein said fan shaft comprises:
   A) said transaxle drive sprocket at the first end of said fan shaft,
   B) a engine cooling fan at the second end of said fan shaft, wherein said engine cooling fan is powered when said drive selection sleeve is engaged to said transaxle drive sprocket.

26. The roadable aircraft as in claim 24, wherein said aircraft channeling means comprises:
   A) a propeller driven sprocket,
   B) a propeller toothed belt engaging said propeller drive sprocket and said propeller driven sprocket, and
   C) a propeller shaft rigidly connected to said propeller driven sprocket at a first end and said propeller at a second end.

27. The roadable aircraft as in claim 24, wherein said propeller drive sprocket is a propeller drive gear and wherein said aircraft channeling means comprises:
   A) a propeller driven gear,
   B) at least one idler gear engaged with said propeller driven gear and said propeller drive gear,
   C) a propeller shaft rigidly connected to said propeller driven gear at a first end and said propeller at a second end.

28. The roadable aircraft as in claim 24, wherein said propeller drive sprocket is a propeller drive gear and wherein said aircraft channeling means comprises:
   A) a propeller driven gear engaged with said propeller drive gear,
   B) a propeller shaft rigidly connected to said propeller driven gear at a first end and said propeller at a second end.

29. The roadable aircraft as in claim 24, wherein said automobile channeling means comprises:
   A) a transaxle driven sprocket,
   B) a transaxle toothed belt engaged with said transaxle driven sprocket and said transaxle drive sprocket,
   C) a clutch shaft rigidly connected to said transaxle driven sprocket,
   D) a clutch rigidly connected to said clutch shaft,
   E) a transaxle engaged with said clutch, wherein said transaxle functions as differential and transmission, and
   F) drive axles attached to said transaxle through universal joints and connected to main load bearing wheels through universal joints.

30. The roadable aircraft as in claim 21, wherein said selectable drive means comprises:
   A) an output shaft rigidly connected to the crankshaft of said engine at a first end and comprising a spline at its second end,
   B) propeller drive sprocket bearings rigidly mounted on said output shaft,
   C) a propeller drive sprocket for channeling power through an aircraft channeling means to said assembly's propeller during said aircraft operations, wherein said propeller drive sprocket is mounted on said bearings and free to rotate on said bearings and comprising a spline,
   D) a pump shaft rotationally mounted adjacent to said output shaft, wherein the rotational axis of said pump shaft is aligned with the rotation axis of said output shaft, wherein said pump shaft comprises a first and second end comprising a spine rigidly connected at said pump shaft's first end, E) a hydraulic pump rigidly connected to said pump shaft's second end, F) an engine cooling fan rigidly connected to said pump shaft for providing engine cooling during said automobile operations, G) a drive selection sleeve slidably mounted to said output shaft comprising a spline receptacle to engage said spline on said propeller drive sprocket and said spline on said pump shaft, wherein during said aircraft operations, said drive selection sleeve slidably engages said spline on said propeller drive sprocket, wherein during said automobile operations, said drive selection sleeve slidably engages said spline on said pump shaft.

31. The roadable aircraft as in claim 21, further comprising:

A) at least one wheel for steering located forward of said at least one load bearing drive wheel, wherein the center of gravity of said roadable aircraft is sufficiently forward of said at least one load bearing drive wheel to provide tipping resistance during acceleration and simultaneously apply adequate force on said at least one wheel for steering for reliable steering.

32. The roadable aircraft as in claim 31, further comprising:

A) a nose at the forward end of said roadable aircraft,

B) a tail structure rigidly connected to said fuselage, and

C) a horizontal stabilizer positioned immediately rearward of said propeller and pivotally connected to said tail structure, wherein rotation of said propeller creates a propeller slipstream, wherein said propeller slipstream is directed to said horizontal stabilizer causing a propeller slipstream deflection, wherein said propeller slipstream deflection is sufficiently large enough to cause a nose rotation moment to overcome said center of gravity positioned forward of said at least one load bearing wheel, wherein lifting of said nose during takeoff becomes less difficult.

33. The roadable aircraft as in claim 31, further comprising:

A) a nose at the forward end of said roadable aircraft,

B) a tail structure rigidly connected to said fuselage,

C) a horizontal stabilizer positioned immediately rearward of said propeller and rigidly connected to said tail structure, and D) a hinged elevator fitted to said horizontal stabilizer for positioning said horizontal stabilizer, wherein rotation of said propeller creates a propeller slipstream, wherein said propeller slipstream is directed to said horizontal stabilizer causing a propeller slipstream deflection, wherein said propeller slipstream deflection is sufficiently large enough to cause a nose rotation moment to overcome said center of gravity positioned forward of said at least one load bearing wheel, wherein lifting of said nose during takeoff becomes less difficult.

34. The roadable aircraft as in claim 21, wherein the center of pressure of said roadable aircraft is near said at least one load bearing wheel during said automobile operations to prevent crosswinds from causing unacceptable yawing forces on said roadable aircraft when said crosswinds are approaching from approximately ninety degrees to said travel direction.

35. An aircraft having folding wings comprising:

A) two wings each comprising:
  i) an inner panel, and
  ii) a detachable outer panel, B) a means for detaching or folding said detachable outer panel, C) at least one movable element attached to said detachable outer panel, D) an outer pushrod comprising a latch slot, wherein said outer pushrod is capable of moving said at least one movable element, E) an upper rocker comprising a rocker slot, wherein said upper rocker is pivotally mounted to said outer pushrod and said detachable outer panel, F) a lower rocker pivotally mounted to said inner panel, G) a lower rocker tab rigidly mounted to said lower rocker, H) a latch rocker pivotally mounted to said upper rocker, I) a latch spring rigidly connected to said latch rocker and said upper rocker, wherein said latch spring under compression provides a bias forcing said latch rocker tight against said lower rocker tab, J) a latch bar pivotally connected to said latch rocker, and K) a latch pin rigidly connected to said latch bar and positioned in said rocker slot in said unfolded position, wherein any separation of said detachable outer panels causes automatic locking of said at least one movable element.

36. The aircraft of claim 35, wherein said at least one movable element is a flap.

37. The aircraft of claim 35, wherein said at least one movable element is an aileron.

38. The aircraft of claim 35, wherein said at least one moveable element is a slat.

39. A roadable aircraft capable of aircraft operations and automobile operations, comprising:

A) a fuselage comprising an engine with an engine shaft and defining a travel direction, B) a propeller, C) at least one wheel for steering, D) two wings each of which comprise ailerons, E) at least one yoke for controlling said ailerons during said aircraft operations and said at least one wheel for steering during said automobile operations, F) rudder pedals for controlling rudders and said at least one wheel for steering during said aircraft operations, G) a yoke post for controlling a horizontal stabilizer, wherein said yoke post is pivotally mounted to said fuselage, wherein said at least one yoke is pivotally mounted to said yoke post, and H) a switching means for switching said control of said one wheel for steering to said at least one yoke during said automobile operations.

40. The roadable aircraft as in claim 39, wherein said switching means comprises:

A) a steering mixer rocker for transmitting steering signals from said rudder pedals and said at least one yoke to said at least one wheel for steering, wherein said steering mixer rocker is pivotally mounted to said fuselage, B) a steering sprocket comprising a spline, wherein said steering sprocket is pivotally mounted to said yoke post, C) a steering arm comprising a spline, wherein said steering arm is pivotally mounted to said fuselage, D) a steering mixer pushrod defining a first end and a second end, wherein said steering mixer pushrod is pivotally mounted to said steering arm at said first end and said steering mixer rocker at said second end, and E) a steering sleeve, slidably engaged to said spline on said steering arm at all times and slidably engaged to said spline on said steering sprocket when said control of said at least one wheel for steering is through said at least one yoke.

41. A roadable aircraft capable of aircraft operations and automobile operations, comprising:

A) a fuselage comprising an engine with an engine shaft and defining a travel direction, B) a propeller, C) at least one load bearing drive wheel, D) a selectable drive mechanism for alternately driving from said engine shaft said propeller or said drive wheel as selected by an operator, and E) at least one wheel for steering located forward of said at least one load bearing drive wheel, wherein the center of gravity of said roadable aircraft is sufficiently forward of said at least one load bearing drive wheel to provide tipping resistance during acceleration and simultaneously apply adequate force on said at least one wheel for steering for reliable steering.

42. The roadable aircraft as in claim 41, further comprising:

A) a nose at the forward end of said roadable aircraft,

B) a tail structure rigidly connected to said fuselage, and

C) a horizontal stabilizer positioned immediately rearward of said propeller and pivotally connected to said tail structure, wherein rotation of said propeller creates a propeller slipstream, wherein said propeller slipstream is directed to said horizontal stabilizer causing a propeller slipstream deflection, wherein said propeller slipstream deflection is sufficiently large enough to cause a nose rotation moment to overcome said center of gravity positioned forward of said at least one load bearing wheel, wherein lifting of said nose during takeoff becomes less difficult.

43. The roadable aircraft as in claim 41, further comprising:

A) a nose at the forward end of said roadable aircraft,

B) a tail structure rigidly connected to said fuselage,

C) a horizontal stabilizer positioned immediately rearward of said propeller and rigidly connected to said tail structure, and D) a hinged elevator fitted to said horizontal stabilizer for positioning said horizontal stabilizer, wherein rotation of said propeller creates a propeller slipstream, wherein said propeller slipstream is directed to said horizontal stabilizer causing a propeller slipstream deflection, wherein said propeller slipstream deflection is sufficiently large enough to cause a nose rotation moment to overcome said center of gravity positioned forward of said at least one load bearing wheel, wherein lifting of said nose during takeoff becomes less difficult.

* * * * *